US011787037B2

(12) United States Patent
Sakaino

(10) Patent No.: US 11,787,037 B2
(45) Date of Patent: Oct. 17, 2023

(54) BEHAVIOR ESTIMATION APPARATUS, BEHAVIOR ESTIMATION METHOD, AND BEHAVIOR ESTIMATION PROGRAM

(71) Applicant: University of Tsukuba, Ibaraki (JP)

(72) Inventor: Sho Sakaino, Tsukuba (JP)

(73) Assignee: University of Tsukuba, Ibaraki (JP)

( * ) Notice: Subject to any disclaimer, the term of this patent is extended or adjusted under 35 U.S.C. 154(b) by 422 days.

(21) Appl. No.: 15/733,744

(22) PCT Filed: Mar. 20, 2019

(86) PCT No.: PCT/JP2019/011693
§ 371 (c)(1),
(2) Date: Oct. 12, 2020

(87) PCT Pub. No.: WO2019/202900
PCT Pub. Date: Oct. 24, 2019

(65) Prior Publication Data
US 2021/0031358 A1    Feb. 4, 2021

(30) Foreign Application Priority Data
Apr. 15, 2018  (JP) .................................. 2018-078057

(51) Int. Cl.
*B25J 3/00*      (2006.01)
*B25J 9/16*      (2006.01)
*B25J 13/08*     (2006.01)

(52) U.S. Cl.
CPC ............... *B25J 3/00* (2013.01); *B25J 9/1697* (2013.01); *B25J 13/085* (2013.01)

(58) Field of Classification Search
CPC . B25J 3/00; B25J 9/1697; B25J 13/085; B25J 9/1689; B25J 3/04; G05B 2219/40116
(Continued)

(56) References Cited

U.S. PATENT DOCUMENTS 4,234,919 A * 11/1980 Bruce .................... G06F 13/36
                                                710/306
7,453,227 B2 * 11/2008 Prisco ................... B25J 9/1689
                                                700/254
(Continued)

FOREIGN PATENT DOCUMENTS

JP    2007276052 A    10/2007
JP    2008304970 A    12/2008
(Continued)

OTHER PUBLICATIONS

"European Application Serial No. 19788436.4, Extended European Search Report dated Dec. 2, 2021", 117 pgs.
(Continued)

*Primary Examiner* — Jaime Figueroa
(74) *Attorney, Agent, or Firm* — Schwegman Lundberg & Woessner, P.A

(57) ABSTRACT

[Problem] Learning of object operation skills robust against variation of conditions is implemented.
[Solution] A behavior estimation apparatus 100 includes a collection unit 200 configured to collect skill data obtained when a slave robot is operated under a plurality of different conditions by using a bilateral system capable of operating the slave robot via a master robot through bidirectional control between the master robot and the slave robot. The behavior estimation apparatus 100 further includes a behavior estimation device 300 configured to estimate a command value for causing the slave robot 520 to automatically behave, based on the skill data collected by the collection unit 200 and a response output from the slave robot 520.

15 Claims, 22 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 7,657,345 | B2* | 2/2010 | Endo | B62D 57/032 318/568.17 |
| 8,004,229 | B2* | 8/2011 | Nowlin | B25J 3/00 318/568.2 |
| 8,541,970 | B2* | 9/2013 | Nowlin | A61B 34/37 318/560 |
| 9,114,530 | B2* | 8/2015 | Tsusaka | G05B 19/423 |
| 9,327,397 | B1* | 5/2016 | Williams | B25J 3/04 |
| 10,881,472 | B2* | 1/2021 | Sen | A61B 34/20 |
| 11,413,101 | B2* | 8/2022 | Sen | A61B 34/30 |
| 2006/0142657 | A1* | 6/2006 | Quaid | A61B 90/37 600/424 |
| 2007/0013336 | A1* | 1/2007 | Nowlin | A61B 34/77 318/568.21 |
| 2010/0274087 | A1* | 10/2010 | Diolaiti | A61B 34/72 700/275 |
| 2011/0264112 | A1* | 10/2011 | Nowlin | A61B 90/37 606/130 |
| 2013/0211587 | A1* | 8/2013 | Stephens, Jr. | B25J 3/04 901/1 |
| 2013/0310977 | A1* | 11/2013 | Tsusaka | B25J 9/1656 700/257 |
| 2014/0195052 | A1* | 7/2014 | Tsusaka | A61B 34/77 700/260 |
| 2015/0073595 | A1* | 3/2015 | Fudaba | B25J 9/1689 901/8 |
| 2016/0062954 | A1* | 3/2016 | Ruff | G06F 40/205 715/249 |
| 2016/0207196 | A1 | 7/2016 | Ohnishi et al. | |
| 2017/0036346 | A1* | 2/2017 | Kamioka | B62D 57/032 |
| 2018/0222048 | A1* | 8/2018 | Hasegawa | B25J 9/1697 |
| 2018/0222057 | A1* | 8/2018 | Mizobe | B25J 9/161 |

FOREIGN PATENT DOCUMENTS

| | | |
|---|---|---|
| JP | 2009279699 A | 12/2009 |
| JP | 2011224696 A | 11/2011 |
| WO | WO-2015041046 A1 | 3/2015 |
| WO | WO-2016132398 A1 | 8/2016 |

OTHER PUBLICATIONS

Kyo, Seinan, "Reproduction of Motion Obtained in Bilateral Control Considering Environment Position", 2015 IEEE International Conference Onmechatronics (ICM), (May 6, 2015), 6 pgs.

Lshiguro, Yasuhiro, "Bilateral remote teaching and autonomous task execution with task progress feedback", Advanced Robotics 32:6, (Mar. 7, 2018), 15 pgs.

Slama, T, "Robust bilateral generalized predictive control for teleoperation systems", ControlandAutomation, 2007. MED Mediterranean Conference On, IEEE, (Jun. 1, 2007), 6 pgs.

Stein, Matthew R, "Behavior-Based Control for Time-Delayed Teleoperation", Retrieved from the Internet:URL:http: citeseerx.ist. psu.edu viewdoc download?doi=10.1.1.56.7856andrep=replandtype= pdf [retrieved on Nov. 22, 2021], (Jan. 1, 1994), 162 pgs.

Susa, Shigeru, "Three-Channel Micro-Macro Bilateral Control System with Scaling of Control Gains", Industrial Electronics, IECON 2008.34th Annual Conference of IEEE,, (2008), 6 pgs.

"International Application Serial No. PCT/JP2019/011693, International Search Report dated Jun. 18, 2019", w/ English Translation, (dated Jun. 18, 2019), 4 pgs.

"International Application Serial No. PCT/JP2019/011693, Written Opinion dated Jun. 18, 2019", (4 pgs.), 4.

* cited by examiner

BEHAVIOR ESTIMATION APPARATUS, BEHAVIOR ESTIMATION METHOD, AND BEHAVIOR ESTIMATION PROGRAM

PRIORITY APPLICATIONS

This application is a U.S. National Stage Filing under 35 U.S.C. § 371 from International Application No. PCT/JP2019/011693, filed on Mar. 20, 2019, and published as WO2019/202900 on Oct. 24, 2019, which claims the benefit of priority to Japanese Application No. 2018-078057, filed on Apr. 15, 2018; the benefit of priority of each of which is hereby claimed herein, and which applications and publication are hereby incorporated herein by reference in their entireties.

TECHNICAL FIELD

The present invention relates to a behavior estimation apparatus, a behavior estimation method, and a behavior estimation program.

BACKGROUND ART

In recent years, there has been a demand for causing a robot to perform various object operation procedures performed by a human. For example, the object operation procedures include harvesting or cropping of agricultural work, constructions, picking at a warehouse, cooking, surgery, doing the laundry, and the like.

To cause a robot to perform the object operation procedures instead of a human, a method for causing the robot to learn object operation skills by using reinforcement learning has been known. The reinforcement learning is a type of machine learning in which an agent observes the current situation in a certain environment and determines a behavior to be carried out. The agent gains reward from the environment by selecting a behavior. In the reinforcement learning, a scheme that may lead to the highest reward is learned through a series of behaviors.

However, the method of learning the object operation skills by using the reinforcement learning requires a great number of times of object operations. The object operation cannot be reproduced using software such as that of the game of "Go", and thus the time required for a single attempt cannot be shortened. Accordingly, reduction of the number of times of attempts is desired.

As a countermeasure, a method of causing the robot to learn the object operation skills by using imitation learning has been known. The imitation learning, which is also known as "learning from demonstration", is a method in which, for example, data obtained when a robot is operated by a position command of an operator is collected, and the robot is thereby caused to learn the object operation skills based on the collected data. With the use of the imitation learning, significant reduction of the number of times of attempts can be expected.

However, in the field of the imitation learning, bidirectional property between the operator and the robot is not taken into consideration at the time of data collection, which has been posing a problem in that a human cannot sufficiently exert the object operation skills. As a result, the success rate of the object operations is not high enough, and there is room for further improvement.

In this respect, a bilateral system that takes into consideration the bidirectional property between the operator and the robot has been known. The bilateral system is a system in which bidirectional control is performed between a master robot operated by an operator and a slave robot that acts in cooperation with the master robot. Data obtained when the master robot is operated is stored, and the stored data is reproduced, thereby the slave robot can be caused to reproduce the operation of the operator.

CITATION LIST

Patent Literature

PTL 1: JP 2009-279699 A
PTL 2: WO 2015/041046

SUMMARY OF INVENTION

Technical Problem

However, because of the assumption that there is no variation in the conditions between when the data is stored and when the data is reproduced, the bilateral system simply stores data and directly reproduces the data. The bilateral system of the related art does not include a mechanism for detecting a surrounding environment. For these reasons, in the bilateral system of the related art, it is difficult to perform the object operation when a condition varies.

In view of this, one embodiment of the invention of the present application has an object to implement learning of object operation skills robust against variation of conditions.

Solution to Problem

One embodiment of a behavior estimation apparatus according to the invention of the present application includes: a collection unit configured to collect skill data obtained when a slave apparatus is operated under a plurality of different conditions by using a bilateral system capable of operating the slave apparatus via a master apparatus through bidirectional control between the master apparatus and the slave apparatus; and a behavior estimation device configured to estimate a command value for causing a control target object to automatically behave, based on the skill data collected by the collection unit and a response output from the control target object.

The behavior estimation device may be configured to estimate a position command value and a force command value as the command value for causing the control target object to automatically behave. The behavior estimation apparatus may further include a position controller configured to output position control input to be input to the control target object, based on the position command value estimated by the estimation device and a position response output from the control target object, and a force controller configured to output force control input to be input to the control target object, based on the force command value estimated by the estimation device and a force response output from the control target object.

The master apparatus may be a master robot configured to act according to operation of an operator. The slave apparatus may be a slave robot configured to act according to action of the master robot. The bilateral system may allow the operator to recognize reaction information from the slave robot and perform adaptive operation through the bidirectional control between the master robot and the slave robot.

The collection unit may collect the skill data obtained when the slave apparatus is operated according to a control delay of action of the slave apparatus in response to operation of the master apparatus when the slave apparatus is operated by using the bilateral system. The behavior estimation device may estimate the command value for causing the control target object to automatically behave, based on the skill data obtained when the slave apparatus is operated according to the control delay of the action of the slave apparatus and collected by the collection unit, and the response output from the control target object.

The slave apparatus may include at least one of an image capturing unit capable of capturing a surrounding environment of the slave apparatus, an acoustic signals acquisition unit capable of acquiring surrounding acoustic information of the slave apparatus, or a haptic signals acquisition unit capable of acquiring haptic information of the slave apparatus.

A pre-processing unit configured to perform pre-processing on at least any one of a position response and a force response output from the control target object, a position command value and/or a force command value output from the behavior estimation device, and position control input and/or force control input to be input to the control target object may further be included.

The pre-processing unit may perform, on at least any one of the force response output from the control target object, the force command value output from the behavior estimation device, or the force control input to be input to the control target object, the pre-processing such that a first variation of value after the pre-processing becomes larger than a second variation of value after the pre-processing, the first variation of value corresponding to variation, in a first range, of the force response, the force command value, or the force control input, the second variation of value corresponding to variation, in a second range larger than the first range, of the force response, the force command value, or the force control input.

A force classification unit configured to classify at least any one of the force response output from the control target object, the force command value output from the behavior estimation device, or the force control input to be input to the control target object into a plurality of the force responses, a plurality of the force command values, and a plurality of the force control inputs according to a magnitude of the force response, the force command value, or the force control input, respectively, may further be included. The plurality of the force responses, the plurality of the force command values, or the plurality of the force control inputs classified by the force classification unit may be handled as different force responses, different force command values, or different force control inputs, respectively.

One embodiment of a behavior estimation method according to the invention of the present application includes the steps of: collecting skill data obtained when a slave apparatus is operated under a plurality of different conditions by using a bilateral system capable of operating the slave apparatus via a master apparatus through bidirectional control between the master apparatus and the slave apparatus; and estimating a command value for causing a control target object to automatically behave, based on the skill data collected by the collecting and a response output from the control target object.

One embodiment of a behavior estimation program according to the invention of the present application causes a computer to perform: collecting skill data obtained when a slave apparatus is operated under a plurality of different conditions by using a bilateral system capable of operating the slave apparatus via a master apparatus through bidirectional control between the master apparatus and the slave apparatus; and estimating a command value for causing a control target object to automatically behave, based on the skill data collected by the collecting and a response output from the control target object.

Advantageous Effects of Invention

According to one embodiment of the invention of the present application, learning of object operation skills robust against variation of conditions can be implemented.

DESCRIPTION OF EMBODIMENTS

Embodiments of a behavior estimation apparatus, a behavior estimation method, and a behavior estimation program according to the invention of the present application will be described below with reference to the drawings.

Figure 1:
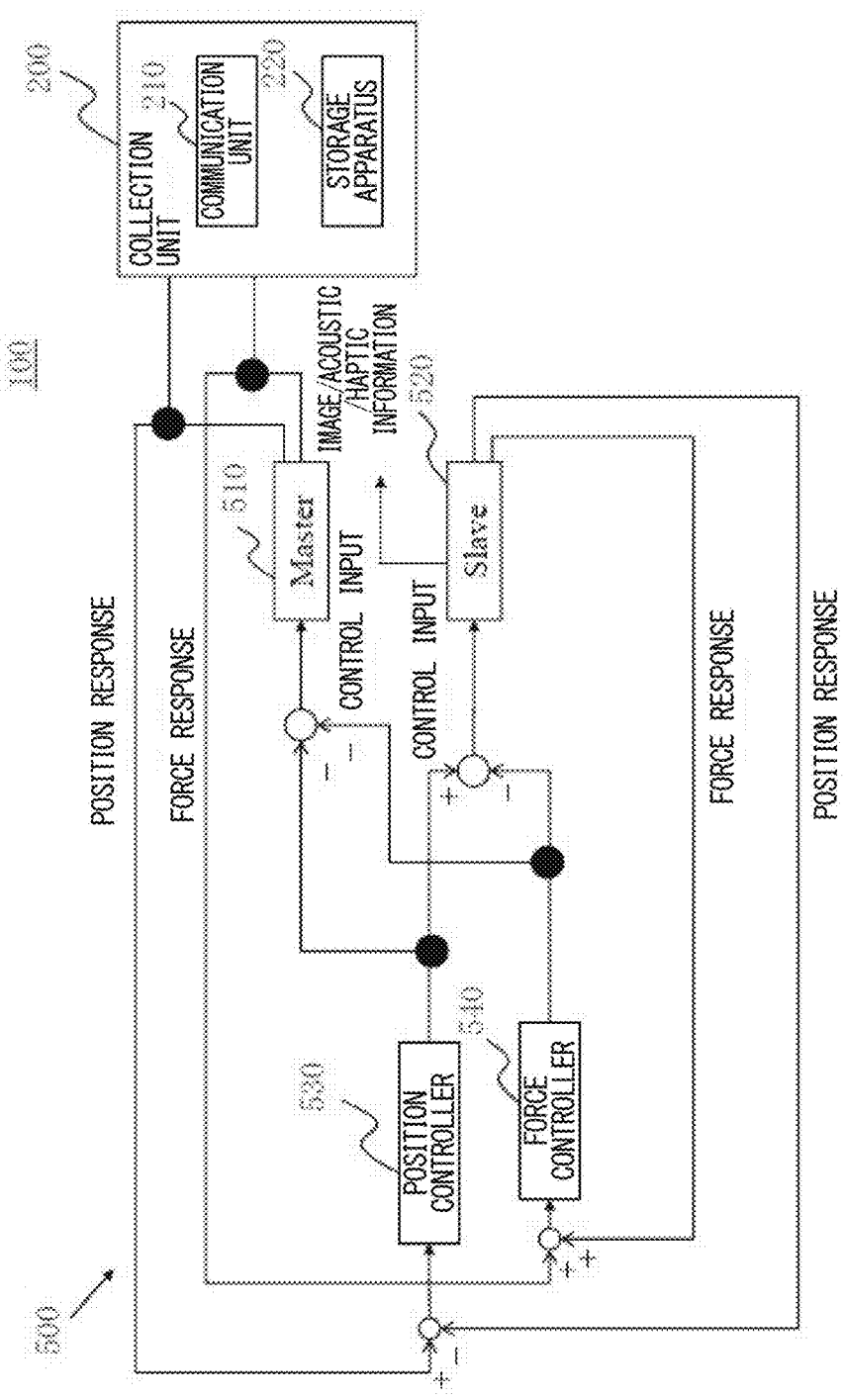
FIG. 1 is a block diagram illustrating an outline of a behavior estimation apparatus according to one embodiment.
Figure 2:
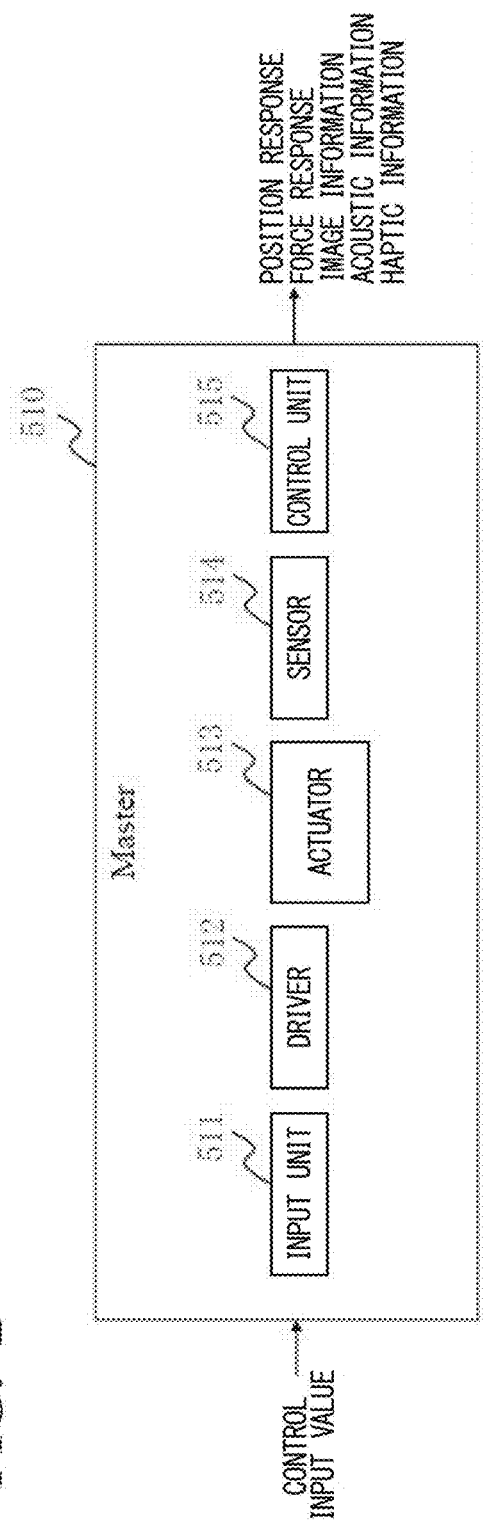
FIG. 2 is a block diagram illustrating an outline of a master robot according to one embodiment.
Figure 3:
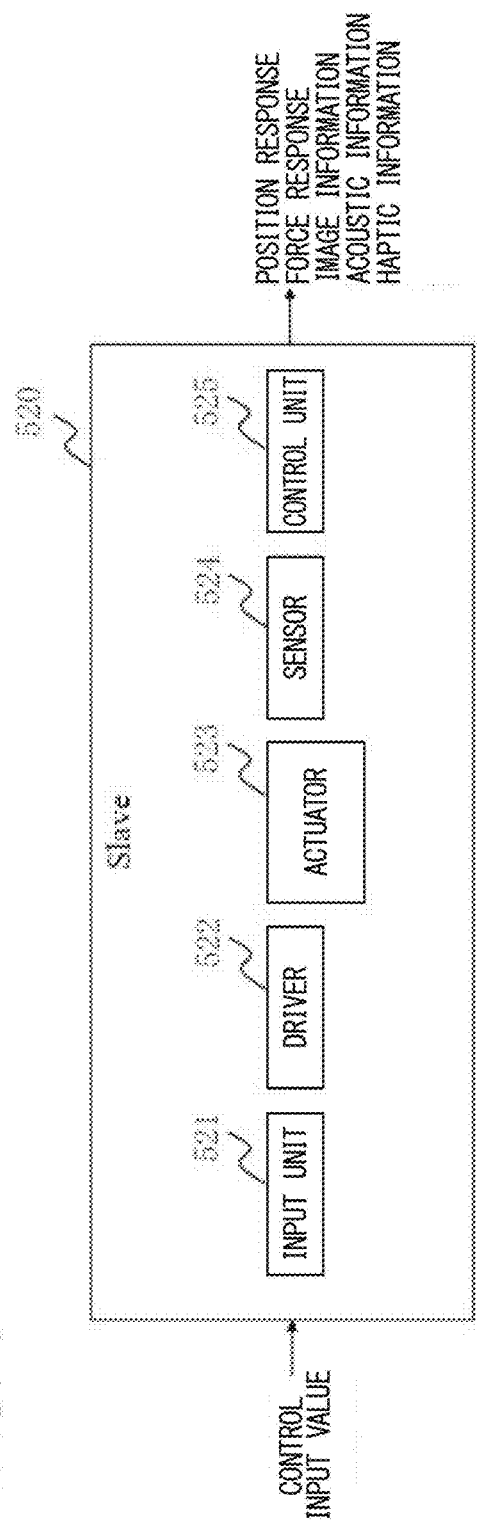
FIG. 3 is a block diagram illustrating an outline of a slave robot according to one embodiment.

FIG. 1 is a block diagram illustrating an outline of the behavior estimation apparatus according to one embodiment. FIG. 2 is a block diagram illustrating an outline of a master robot according to one embodiment. FIG. 3 is a block diagram illustrating an outline of a slave robot according to one embodiment.

As illustrated in FIG. 1, a behavior estimation apparatus 100 includes a collection unit 200 that collects skill data of an operator by using a bilateral system 500.

Bilateral System

First, a bilateral system 500 will be described. The bilateral system 500 includes a master robot 510, a slave robot 520, a position controller 530, and a force controller 540. The bilateral system 500 is capable of remotely operating the slave robot 520 via the master robot 510 by performing bidirectional control between the master robot 510 and the slave robot 520.

Specifically, the master robot 510 includes an input unit 511, a driver 512, an actuator 513, a sensor 514 that includes any one of a position sensor, a force sensor, an image sensor (image capturing unit), a microphone (acoustic acquisition unit), and a haptic sensor (haptic acquisition unit) installed in the actuator 513, and a control unit 515. The master robot 510 is configured to act according to the actuator 513 in response to an operation of an operator.

The input unit 511 may include a communication interface (communication I/F) that receives a control input value input to the master robot 510 and outputs the control input value to the driver 512 The driver 512 converts the control input value input via the input unit 511 into a specific control command value (a voltage value, a current value, or the like) for the actuator 513, and outputs the control command value to the actuator 513. The actuator 513 is driven according to the control command value input from the driver 512, and controls a position of a control target object. The sensor 514 detects a position and a force of the control target object controlled by the actuator 513 and a surrounding environment of the master robot 510, and outputs a detection value to the control unit 515. The control unit 515 is configured to output a position (speed) response, a force response, image information, acoustic information, and haptic information, based on time series detection values detected by the sensor 514.

Similarly to the master robot 510, the slave robot 520 includes an input unit 521, a driver 522, an actuator 523, a sensor 524 that includes any one of a position sensor, a force sensor, an image sensor (image capturing unit), a microphone (acoustic acquisition unit), and a haptic sensor (haptic acquisition unit) installed in the actuator 523, and a control unit 525.

The slave robot 520 is configured to act according to action of the master robot 510. The input unit 521 may include a communication interface (communication I/F) that receives a control input value input to the slave robot 520 and outputs the control input value to the driver 522. The driver 522 converts the control input value input via the input unit 521 into a specific control command value (a voltage value, a current value, or the like) for the actuator 523, and outputs the control command value to the actuator 523. The actuator 523 is driven according to the control command value input from the driver 522, and controls a position of a control target object. The sensor 524 detects a position and a force of the control target object controlled by the actuator 523 and a surrounding environment of the slave robot 520, and outputs a detection value to the control unit 525. The control unit 525 is configured to output a position (speed) response, a force response, image information, acoustic information, and haptic information, based on time series detection values detected by the sensor 524.

The position controller 530 outputs a position control value, based on the position response output from the master robot 510 and the position response output from the slave robot 520. Specifically, the position controller 530 calculates the position control value such that a difference between the position of the actuator 513 of the master robot 510 and the position of the actuator 523 of the slave robot 520 becomes zero, based on the position response output from the master robot 510 and the position response output from the slave robot 520.

Here, the position controller 530 may have the position of the master robot 510 scaled and have the scaled position transmitted to the slave robot 520. Specifically, the position controller 530 can implement a scaling function for the position. The scaling function refers to a function of increasing or decreasing the scale of the position to be output with respect to a reference control. With the use of the scaling function, the position controller 530 can have the slave robot 520 reproduce the motion of the master robot 510 with the magnitude of the motion increased or decreased, or can have the slave robot 520 reproduce the motion of the master robot 510 with the speed of the motion increased or decreased, for example.

The force controller 540 outputs a force control value, based on the force response output from the master robot 510 and the force response output from the slave robot 520. Specifically, the force controller 540 calculates the force control value such that a force applied to the actuator 513 of the master robot 510 by an operator and a reaction force from an object acting on the actuator 523 of the slave robot 520 satisfy the action-reaction law (both the forces are equal and opposite to each other), based on the force response output from the master robot 510 and the force response output from the slave robot 520.

Here, the force controller 540 may have the force of the master robot 510 scaled and have the scaled force transmitted to the slave robot 520. Specifically, the force controller 540 can implement a scaling function for the force. The scaling function refers to a function of increasing or decreasing the scale of the force to be output with respect to a reference control. With the use of the scaling function, the force controller 540 can have the slave robot 520 reproduce the motion of the master robot 510 with the intensity (force) of the motion increased or decreased, for example.

Control input based on the position control value output from the position controller 530 and the force control value output from the force controller 540 is input to the master robot 510. Control input based on the position control value output from the position controller 530 and the force control value output from the force controller 540 is input to the slave robot 520.

With this configuration, the bilateral system 500 can implement a function (bilateral control function) of transmitting the action of the master robot 510 to the slave robot 520 and feeding back to the master robot 510 the input of the reaction force from an object acting on the slave robot 520. Accordingly, in the bilateral system 500, the operation performed for the master robot 510 can be accurately reproduced in the slave robot 520, and the reaction force from an object input to the slave robot 520 can be accurately transmitted to the master robot 510. Thus, the bilateral system 500 allows an operator to recognize reaction information from the slave robot 520 and perform adaptive operation through the bidirectional control between the master robot 510 and the slave robot 520.

Note that the bilateral system 500 is a system for implementing function(s) of one or a plurality of parts of a human body, and a specific configuration thereof need not necessarily model a human body on the condition that a control rule for implementing the function(s) is applied. The present embodiment illustrates an example in which the master robot 510 and the slave robot 520 are each used as a control target object. However, the control target object is not limited to a robot.

Collection Unit

Next, the collection unit 200 will be described. The collection unit 200 causes a behavior estimation device (AI) 300 described below to learn object operation skills of an operator. The collection unit 200 is configured to collect skill data obtained when the slave robot 520 is operated under a plurality of different conditions by using the bilateral system 500.

Specifically, the collection unit 200 includes a communication unit 210 that receives skill data of the position response and the force response output from the master robot 510, and a storage apparatus 220 that can store the skill data received by the communication unit 210.

The communication unit 210 may include a communication interface (communication I/F) that receives time series position responses and force responses input to the collection unit 200, stores the time series position responses and force responses in the storage apparatus 220 as the skill data, reads from the storage apparatus 220 the skill data, and outputs the skill data. The storage apparatus 220 is a storage medium that can store the skill data input from the communication unit 210. The communication unit 210 can also receive the image/acoustic/haptic information (at least one of the image information, the acoustic information, or the haptic information) output from the slave robot 520 and store the image/acoustic/haptic information in the storage apparatus 220 as the skill data.

The collection unit 200 is configured to collect a plurality of pieces of skill data under a plurality of different conditions. The plurality of pieces of skill data under the plurality of different conditions include, for example, a plurality of pieces of skill data that are collected when a plurality of different operators perform object operations by using the bilateral system 500. The plurality of pieces of skill data under the plurality of different conditions include, for example, a plurality of pieces of skill data that are collected when object operation is performed by using the bilateral system 500 in different states where a position, an angle, or the like of an operation target object is different. Further, the plurality of pieces of skill data under the plurality of different conditions include a plurality of pieces of skill data that are collected when object operation is performed by using the bilateral system 500 including a different master robot 510 or a different slave robot 520.

Note that the collection unit 200 collects skill data obtained when the slave robot 520 is operated according to a control delay of the action of the slave robot 520 in response to the operation of the master robot 510 when the slave robot 520 is operated by using the bilateral system 500. Specifically, in the bilateral system 500, a certain amount of control delay occurs between the time when an operator operates the master robot 510 and the time when the slave robot 520 acts. The operator operates the master robot 510 while visually checking the action of the slave robot 520. Thus, the operator operates the master robot 510 also in consideration of the control delay while recognizing the control delay of the slave robot 520. Accordingly, the skill data collected by the collection unit 200 is data obtained when the slave robot 520 is operated according to the control delay of the action of the slave robot 520 in response to the operation of the master robot 510.

Figure 4:
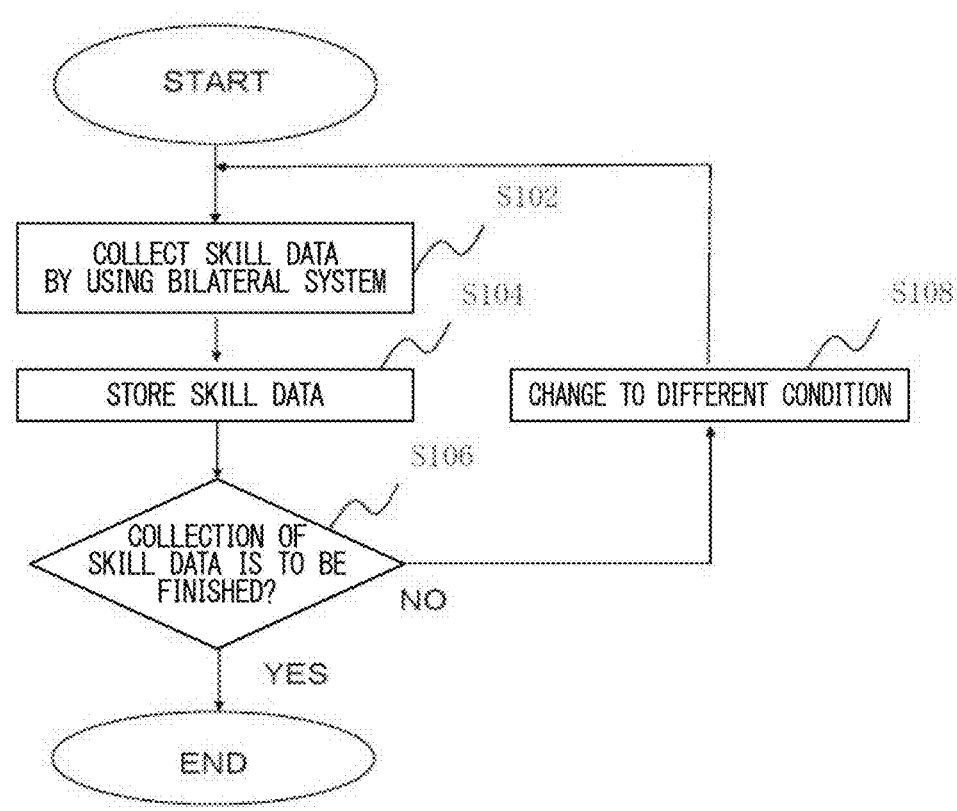
FIG. 4 is a flowchart illustrating operation of the behavior estimation apparatus when skill data is collected.

Here, operation of the behavior estimation apparatus 100 when the skill data is collected will be described. FIG. 4 is a flowchart illustrating operation of the behavior estimation apparatus when the skill data is collected.

When collection process of skill data is started, the collection unit 200 collects skill data obtained when the operator operates the slave robot 520 by using the bilateral system 500 under the first condition (step 102). Subsequently, the collection unit 200 stores the skill data collected in step 102 in the storage apparatus 220 (step 104).

Subsequently, if the collection of the skill data is not finished (NO in step 106), the operator, the position or the angle of an operation target object, or the like is changed to that of a different condition (step 108). The collection unit 200 collects skill data obtained when the slave robot 520 is operated by using the bilateral system 500 again under the second condition after the change (step 102), and stores the skill data collected in step 102 in the storage apparatus 220 (step 104).

Subsequently, if the collection of the skill data is not finished (NO in step 106), the collection unit 200 repeats the collection and storage of the skill data under the different condition after the change. In contrast, if the collection of the skill data is finished (YES in step 106), the collection process of the skill data ends. Note that the behavior estimation program can cause a computer (processor) to execute a process similar to the process described above. The behavior estimation program can be stored in a storage medium that can be read by a processor, and can be executed by the processor.

Behavior Estimation Device

Figure 5:
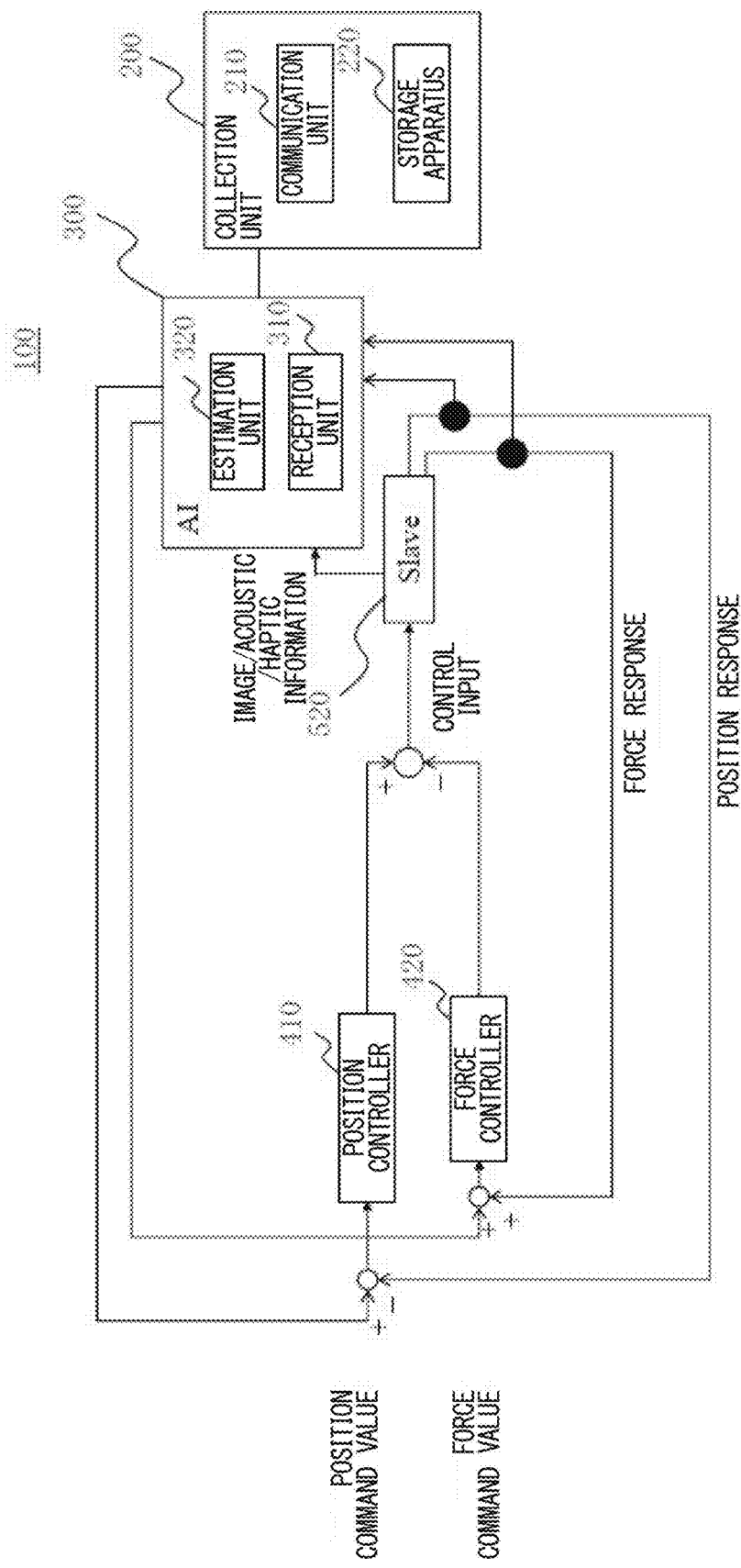
FIG. 5 is a block diagram illustrating an outline of the behavior estimation apparatus according to one embodiment.

Next, the behavior estimation apparatus will be described. FIG. 5 is a block diagram illustrating an outline of the behavior estimation apparatus according to one embodiment. As illustrated in FIG. 5, the behavior estimation apparatus 100 includes a behavior estimation device (AI) 300. The behavior estimation device 300 estimates a command value for causing the control target object to automatically behave, based on the skill data collected by the collection unit 200 and the response and the image/acoustic/haptic information output from the control target object.

Specifically, the behavior estimation device 300 includes a reception unit 310 that receives the skill data collected by the collection unit 200, and the position response, the force response, and the image/acoustic/haptic information output from the slave robot 520. The behavior estimation device 300 further includes an estimation unit 320 that estimates a position command value and a force command value for causing the slave robot 520 to automatically behave based on the skill data, the position response, the force response, and the image/acoustic/haptic information received by the reception unit 310, and outputs the position command value and the force command value. The estimation unit 320 estimates the position command value and the force command value that are least inconsistent with previous control input to the slave robot 520, based on the skill data, the position response, the force response, and the image/acoustic/haptic information received by the reception unit 310. In other words, the estimation unit 320 estimates probabilistically the most correct position command value and force command value, based on the skill data, the position response, the force response, and the image/acoustic/haptic information received by the reception unit 310. Note that the present embodiment illustrates an example in which the behavior estimation device 300 estimates the position command value and the force command value based on the skill data and the position response, the force response, and the image/acoustic/haptic information output from the slave robot 520, and outputs the position command value and the force command value. However, the image/acoustic/haptic information is not necessarily required. The behavior estimation device 300 may estimate the position command value and the force command value based on the skill data and the position response and the force response output from the slave robot 520 without using the image/acoustic/haptic information, and output the position command value and the force command value.

As illustrated in FIG. 5, the behavior estimation apparatus 100 includes a position controller 410 that outputs position control input to be input to the control target object, based on the position command value estimated by the behavior estimation device 300 and the position response output from the slave robot 520 being the control target object. Specifically, the position controller 410 calculates the position control input such that a difference between the position instructed by the position command value and the position of the actuator 523 of the slave robot 520 becomes zero, based on the position command value output from the behavior estimation device 300 and the position response output from the slave robot 520.

As illustrated in FIG. 5, the behavior estimation apparatus 100 includes a force controller 420 that outputs force control input to be input to the control target object, based on the force command value estimated by the behavior estimation device 300 and the force response output from the slave robot 520 being the control target object. Specifically, the force controller 420 calculates the force control input such that the force instructed by the force command value and the reaction force from the object acting on the actuator 523 of the slave robot 520 satisfy the action-reaction law (both the forces are equal and opposite to each other), based on the force command value output from the behavior estimation device 300 and the force response output from the slave robot 520.

Specifically, the behavior estimation apparatus 100 predicts what responses are previously made by the master robot 510, and uses a resultant prediction as a command value. Regarding a control system, the same control system as that used in the case of learning is used. The behavior estimation apparatus 100 performs no coordinate conversion and may perform an incomplete control that causes the position control and the force control to be combined in the z-axis; however, this is not a problem because the behavior estimation device (AI) 300 creates a control.

The behavior estimation device (AI) 300 is a type of object operation AI. Specifically, in general, a robot has a large number of joints, and each of the joints may also have numerous states of position and force response. An object operated by the robot and a surrounding environment in which the robot operates may also have numerous states. As a logical consequence, the number of combinations thereof is an astronomical figure, which makes it impossible to acquire data corresponding to all of the states in advance. In a case where intermediate or extended states can be estimated based on a plurality of pieces of data related to the states described above; however, the number of pieces of data that need to be acquired in advance can be significantly reduced. Thus, the behavior estimation device (AI) 300 according to the present embodiment is capable of state estimation that is robust against variation of objects and surrounding environments by collecting time series data including various states, and is also capable of estimating a behavior of a robot that is appropriate for the state estimation. In contrast, with the use of a single piece of time series data or a plurality of similar pieces of time series data, almost no intermediate or extended states can be estimated, which makes it significantly vulnerable to variation of objects and surrounding environments.

Figure 6:
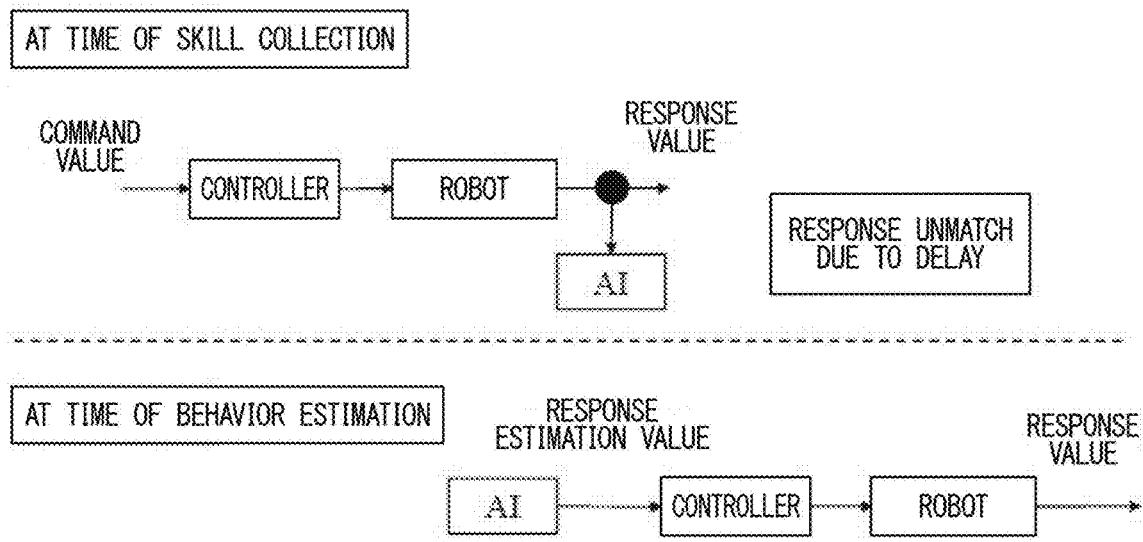
FIG. 6 is a diagram for describing a method of estimating a response of a robot according to related art.
Figure 7:
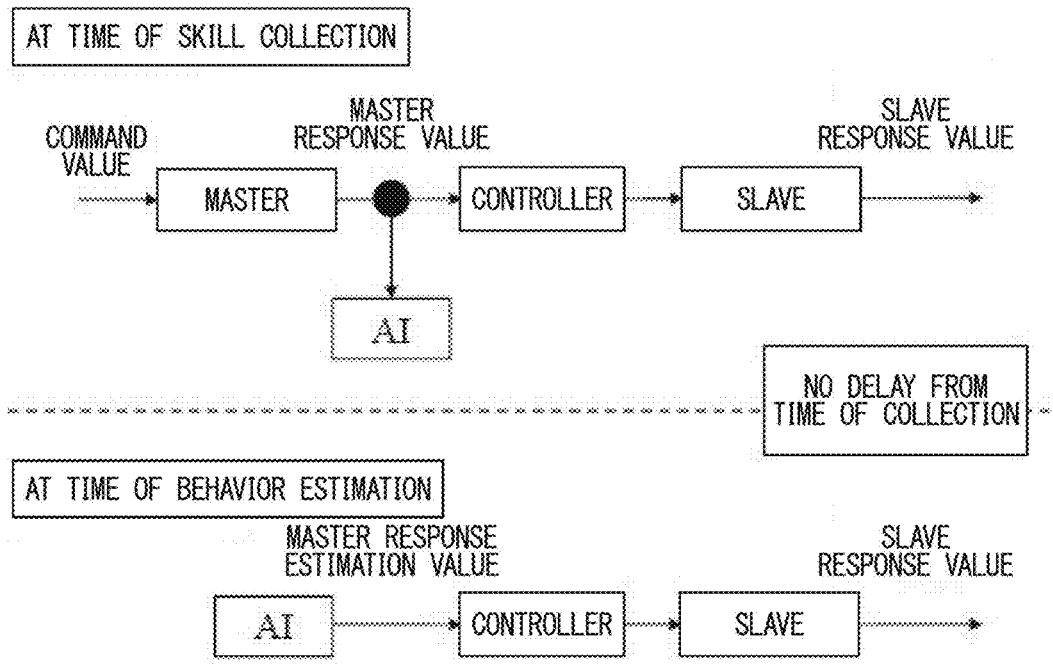
FIG. 7 is a diagram for describing a method of estimating a response of the master robot according to the present embodiment.

Note that the behavior estimation device 300 estimates a command value for causing the slave robot 520 to automatically behave, based on the skill data that is obtained when the slave robot 520 is operated according to a control delay of the action of the slave robot 520 and collected by the collection unit 200, and the response output from the slave robot 520. Specifically, the behavior estimation device 300 learns the skill data obtained when the slave robot 520 is operated also in consideration of the control delay of the action of the slave robot 520 in response to the operation of the master robot 510. Thus, when the behavior estimation device 300 estimates the command value for causing the slave robot 520 to automatically behave, the behavior estimation device 300 estimates the command value also in consideration of the control delay of the action of the slave robot 520 in response to the operation of the master robot 510. Here, the control delay of the action of the slave robot in response to the operation of the master robot will be described. FIG. 6 is a diagram for describing a method of estimating a response of a robot according to related art. As illustrated in FIG. 6, in the related art, only responses can be measured when skills are taught to the robot. Thus, in the related art, a response value is estimated as a command value. However, when a desired response value is used as a command value, a desired response value cannot be obtained due to a response delay of a controller and the robot. As a result, only a slow behavior that can tolerate a delay of the control system and the robot can be implemented. In contrast, FIG. 7 is a diagram for describing a method of estimating a response of the master robot according to the present embodiment. As illustrated in FIG. 7, in the present embodiment, when the bilateral control is used, a response value of the master robot is also used as a command value to the slave robot, and thus a behavior of the slave robot (command value to the slave) can be directly estimated. Consequently, according to the present embodiment, a delay at the time of behavior estimation and at the time of skill collection can be equal. As a result, according to the present embodiment, a behavior as fast as human action is enabled.

Figure 8:
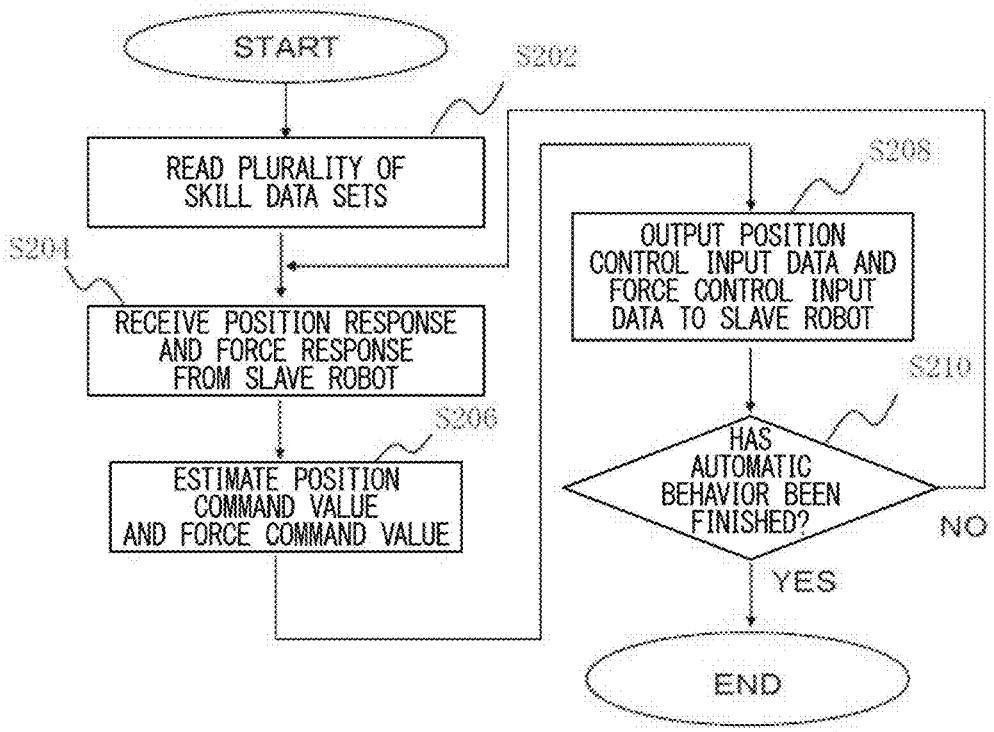
FIG. 8 is a flowchart illustrating operation of the behavior estimation apparatus when a control target object is caused to automatically behave based on collected skill data.

Here, operation of the behavior estimation apparatus 100 when the control target object is caused to automatically behave based on the collected skill data will be described. FIG. 8 is a flowchart illustrating operation of the behavior estimation apparatus 100 when the control target object is caused to automatically behave based on the collected skill data.

When a process for causing the slave robot 520 being the control target object to automatically behave is started, the behavior estimation device (AI) 300 reads a plurality of pieces of skill data stored in the storage apparatus 220 (step 202). Note that the description herein illustrates an example in which the plurality of pieces of skill data are read when the slave robot 520 is caused to automatically behave. However, this is not restrictive, and the behavior estimation device 300 may read a plurality of pieces of skill data in advance.

Subsequently, the behavior estimation device 300 receives the position response and the force response output from the slave robot 520 (step 204). The behavior estimation device 300 estimates the position command value and the force command value, based on the plurality of pieces of skill data and the received position response and force response (step 206).

The position controller 410 and the force controller 420 output position control input and force control input to the slave robot 520, based on the position command value and the force command value estimated by the behavior estimation device 300 and the position response and the force response output from the slave robot 520 (step 208).

If an automatic object operation procedure by the slave robot 520 is not finished (NO in step 210), the process returns to step 204, and the slave robot 520 is caused to automatically behave by repeating the processing from step 204 to step 208. In contrast, if the automatic object operation procedure by the slave robot 520 is finished (YES in step 210), the process ends.

Note that the behavior estimation program can cause a computer (processor) to execute a process similar to the process described above. The behavior estimation program can be stored in a storage medium that can be read by a processor, and can be executed by the processor.

First Specific Example of Behavior Estimation Apparatus

A specific embodiment of the behavior estimation apparatus 100 will be described below. The following description will be given by taking a procedure in which objects having different shapes placed at different positions and angles are held and lifted up as an example of the object operation procedure.

Figure 9:
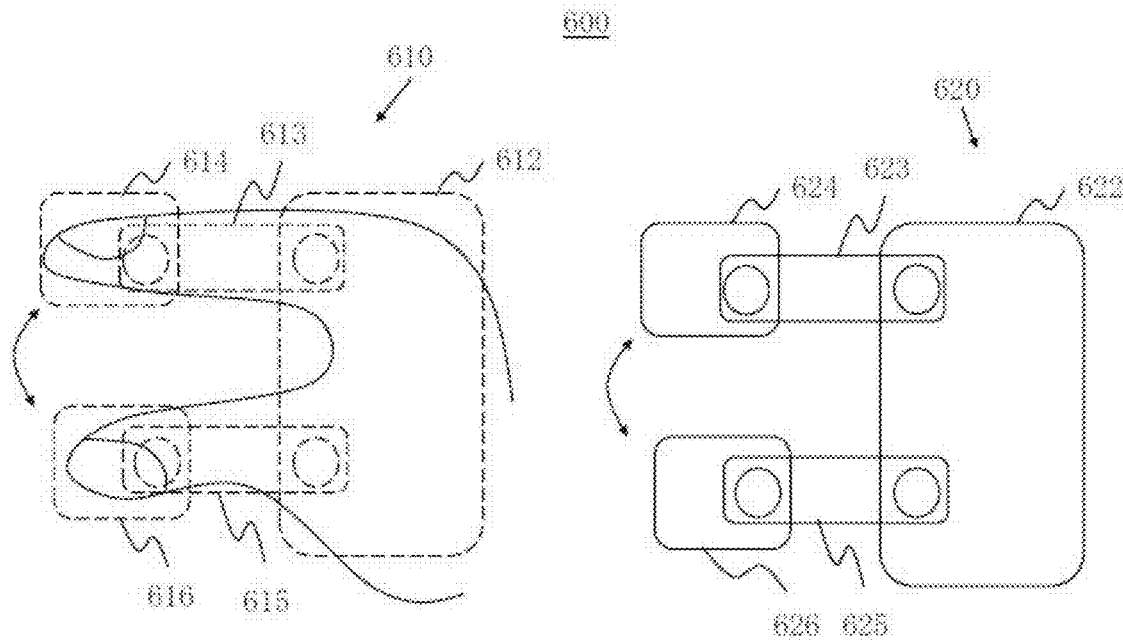
FIG. 9 is a diagram schematically illustrating a bilateral system for holding and lifting up an object.

FIG. 9 is a diagram schematically illustrating a bilateral system for holding and lifting up an object. As illustrated in FIG. 9, a bilateral system 600 for object holding includes a master robot 610 and a slave robot 620.

The master robot 610 includes a base part 612, and holding parts 614 and 616 that are coupled across the base part 612 and arm parts 613 and 615. The base part 612 can adjust a position and an angle according to a motion of the hand of the operator. The holding parts 612 and 614 can adjust a position and an angle according to operation of fingers (for example, an index finger and a thumb) of the operator.

The slave robot 620 is configured to act according to the action of the master robot 610, and includes a base part 622, and holding parts 624 and 626 that are coupled across the base part 622 and arm parts 623 and 625. The base part 622 can adjust a position and an angle according to a motion of the hand of the base part 612. The holding parts 624 and 626 can adjust a position and an angle according to a motion of the holding parts 614 and 616.

FIG. 10 to FIG. 14 are each a diagram schematically illustrating a state in which the skill data is collected under a plurality of different conditions. Note that, in the illustration of FIG. 10 to FIG. 14, for the sake of convenience of description, the master robot 610 and the slave robot 620 are illustrated side by side. However, the master robot 610 and the slave robot 620 can be placed with any positional relationship. For example, the master robot 610 and the slave robot 620 can be placed remotely. In this case, the operator can operate the slave robot 620 while remotely monitoring the image information captured by the image sensor (image capturing unit) of the slave robot 620.

Figure 10:
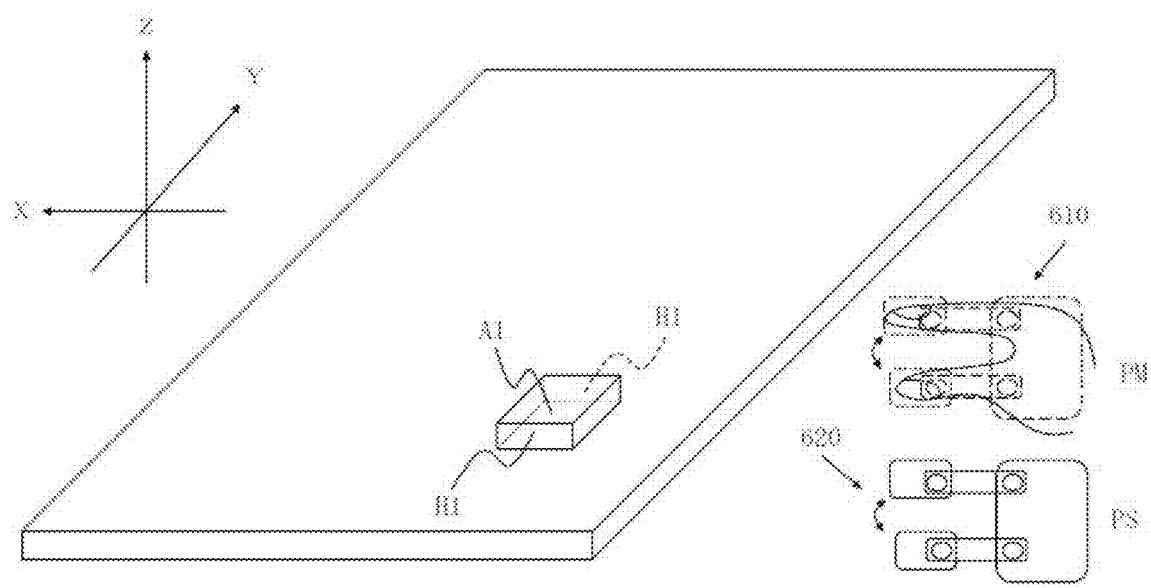
FIG. 10 is a diagram schematically illustrating a state in which the skill data is collected under a plurality of different conditions.

In FIG. 10, an object A1 is placed at a prescribed position. The operator moves the position of the slave robot 620 from an initial position PS closer to the object A1 by moving the position of the master robot 610 from an initial position PM. Subsequently, the operator operates the holding parts 624 and 626 of the slave robot 620 in a direction in which the holding parts 624 and 626 approach each other by operating the holding parts 614 and 616 of the master robot 610. When the holding parts 624 and 626 of the slave robot 620 come into contact with holding surfaces H1 of the object A1, a reaction force from the object A1 is fed back to the master robot 610 via the slave robot 620, and the operator thereby recognizes that the operator has held the object A1. Subsequently, the operator lifts up the object A1 via the slave robot 620 by lifting up the position of the master robot 610 while holding the object A1. The collection unit 200 collects time series skill data of the series of operations described above, and stores the time series skill data in the storage apparatus 220.

Figure 11:
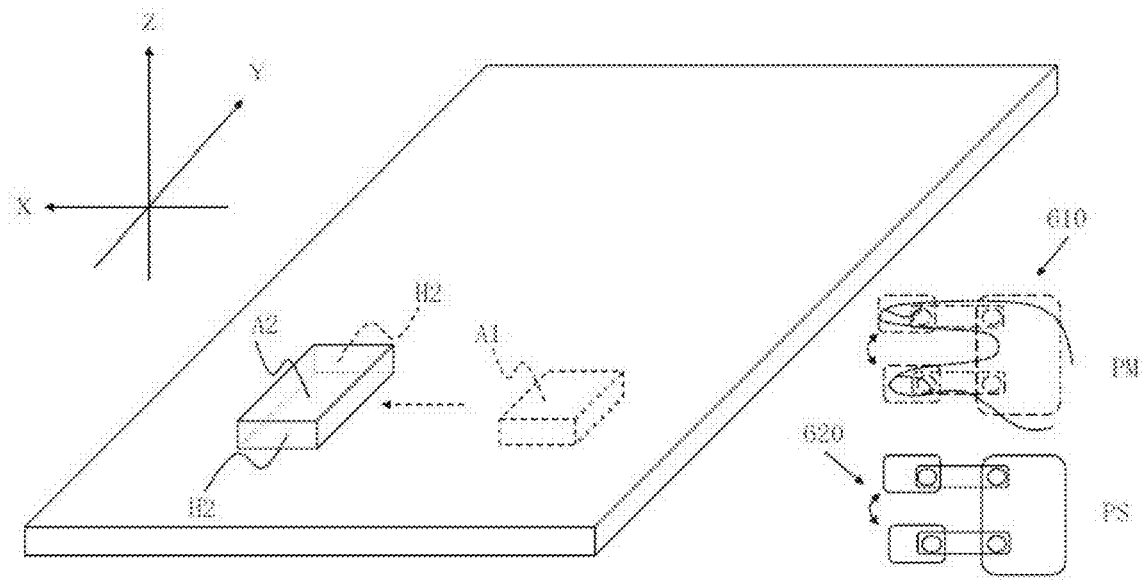
FIG. 11 is a diagram schematically illustrating a state in which the skill data is collected under a plurality of different conditions.

Next, in FIG. 11, an object A2 is placed at a different position in the X-axis direction as compared to the object A1. The object A2 has a different shape from the object A1 in that the length of the object A2 in the Y-axis direction is longer compared to the object A1. The operator moves the position of the slave robot 620 from the initial position PS closer to the object A2 by moving the position of the master robot 610 from the initial position PM. Subsequently, the operator operates the holding parts 624 and 626 of the slave robot 620 in a direction in which the holding parts 624 and 626 approach each other by operating the holding parts 614 and 616 of the master robot 610. When the holding parts 624 and 626 of the slave robot 620 come into contact with holding surfaces H2 of the object A2, a reaction force from the object A2 is fed back to the master robot 610 via the slave robot 620, and the operator thereby recognizes that the operator has held the object A2. Subsequently, the operator lifts up the object A2 via the slave robot 620 by lifting up the position of the master robot 610 while holding the object A2. The collection unit 200 collects time series skill data of the series of operations described above, and stores the time series skill data in the storage apparatus 220.

In comparison to the skill data collected through the object operation procedure of FIG. 10, the skill data collected through the object operation procedure of FIG. 11 is different in an amount of movement of the master robot 610 and the slave robot 620 in the X-axis direction and also in a mutual approach distance of the holding parts 614 and 616 and the holding parts 624 and 626 when the object A2 is held.

Figure 12:
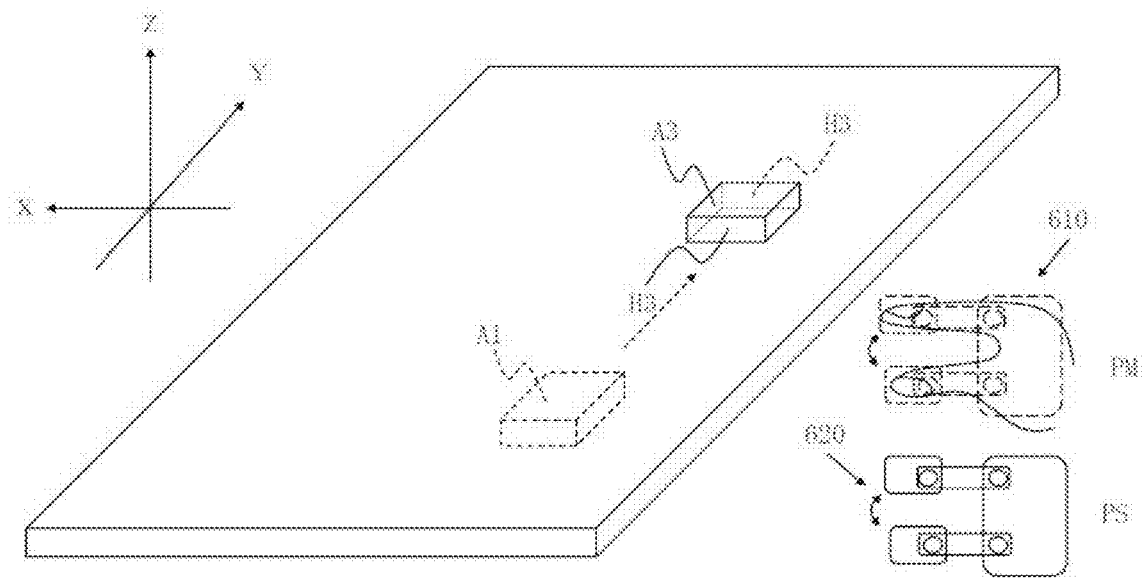
FIG. 12 is a diagram schematically illustrating a state in which the skill data is collected under a plurality of different conditions.

Next, in FIG. 12, an object A3 is placed at a different position in the Y-axis direction as compared to the object A1. The object A3 has a different shape from the object A1 in that the length of the object A3 in the Y-axis direction is shorter as compared to the object A1. The operator moves the position of the slave robot 620 from the initial position PS closer to the object A3 by moving the position of the master robot 610 from the initial position PM. Subsequently, the operator operates the holding parts 624 and 626 of the slave robot 620 in a direction in which the holding parts 624 and 626 approach each other by operating the holding parts 614 and 616 of the master robot 610. When the holding parts 624 and 626 of the slave robot 620 come into contact with holding surfaces H3 of the object A3, a reaction force from the object A3 is fed back to the master robot 610 via the slave robot 620, and the operator thereby recognizes that the operator has held the object A3. Subsequently, the operator lifts up the object A3 via the slave robot 620 by lifting up the position of the master robot 610 while holding the object A3. The collection unit 200 collects time series skill data of the series of operations described above, and stores the time series skill data in the storage apparatus 220.

In comparison to the skill data collected through the object operation procedure of FIG. 10, the skill data collected through the object operation procedure of FIG. 12 is different in an amount of movement of the master robot 610 and the slave robot 620 in the Y-axis direction and also in a mutual approach distance of the holding parts 614 and 616 and the holding parts 624 and 626 when the object A3 is held.

Figure 13:
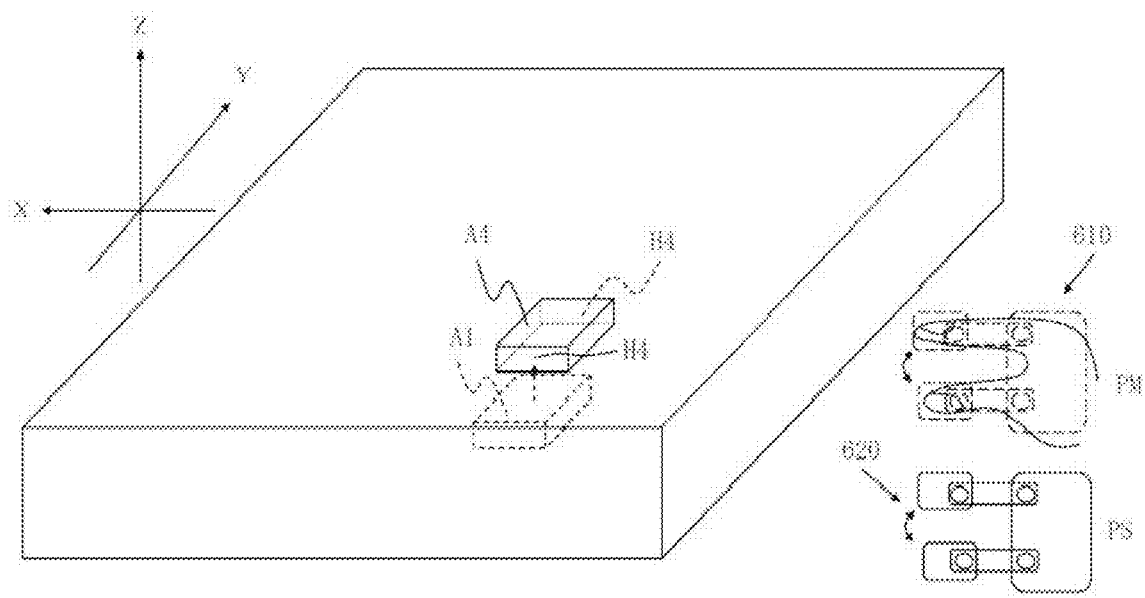
FIG. 13 is a diagram schematically illustrating a state in which the skill data is collected under a plurality of different conditions.

Next, in FIG. 13, an object A4 is placed at a different position in the Z-axis direction as compared to the object A1. The operator moves the position of the slave robot 620 from the initial position PS closer to the object A4 by moving the position of the master robot 610 from the initial position PM. Subsequently, the operator operates the holding parts 624 and 626 of the slave robot 620 in a direction in which the holding parts 624 and 626 approach each other by operating the holding parts 614 and 616 of the master robot 610. When the holding parts 624 and 626 of the slave robot 620 come into contact with holding surfaces H4 of the object A4, a reaction force from the object A4 is fed back to the master robot 610 via the slave robot 620, and the operator thereby recognizes that the operator has held the object A4. Subsequently, the operator lifts up the object A4 via the slave robot 620 by lifting up the position of the master robot 610 while holding the object A4. The collection unit 200 collects time series skill data of the series of operations described above, and stores the time series skill data in the storage apparatus 220.

In comparison to the skill data collected through the object operation procedure of FIG. 10, the skill data collected through the object operation procedure of FIG. 13 is different in an amount of movement of the master robot 610 and the slave robot 620 in the Z-axis direction.

Figure 14:
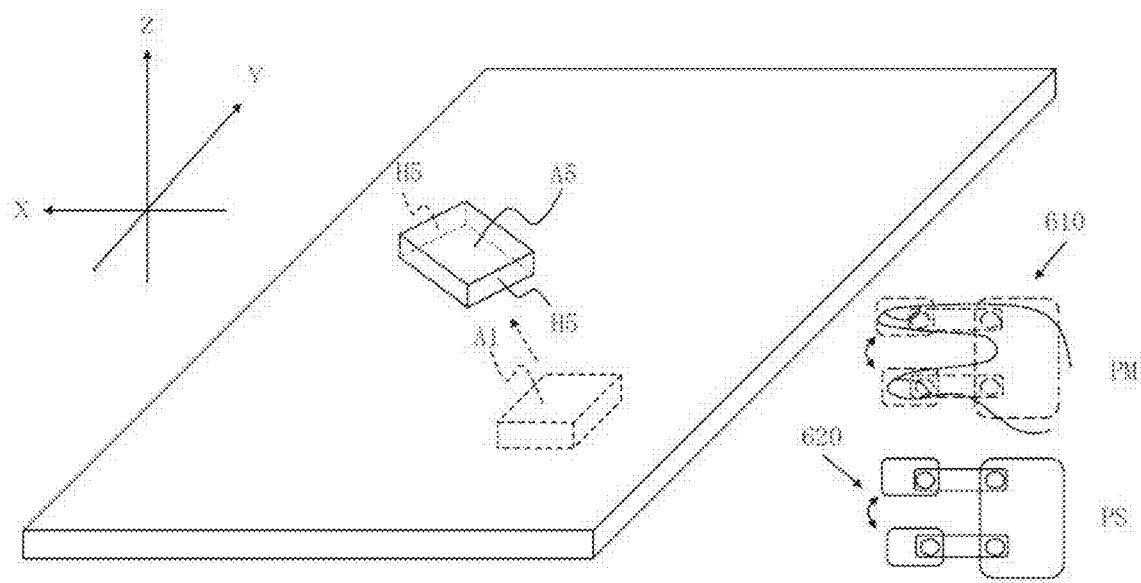
FIG. 14 is a diagram schematically illustrating a state in which the skill data is collected under a plurality of different conditions.

Next, in FIG. 14, an object A5 is placed at a different position in the X-axis direction and the Y-axis direction as compared to the object A1. The object A5 is placed in a state in which the object A5 is rotated counterclockwise about the Z-axis, as compared to the object A1. The operator moves the position of the slave robot 620 from the initial position PS closer to the object A5 by moving the position of the master robot 610 from the initial position PM. Subsequently, because the holding surfaces H5 of the object A5 are rotated about the Z-axis as compared to the holding surfaces H1 of the object A1, the operator rotates the angle of the slave robot 620 about the Z-axis counterclockwise by rotating the angle of the master robot 610 about the Z-axis counterclockwise according to the rotation angle of the holding surfaces of the object A5. Subsequently, the operator operates the holding parts 624 and 626 of the slave robot 620 in a direction in which the holding parts 624 and 626 approach each other by operating the holding parts 614 and 616 of the master robot 610. When the holding parts 624 and 626 of the slave robot 620 come into contact with holding surfaces H5 of the object A5, a reaction force from the object A5 is fed back to the master robot 610 via the slave robot 620, and the operator thereby recognizes that the operator has held the object A5. Subsequently, the operator lifts up the object A5 via the slave robot 620 by lifting up the position of the master robot 610 while holding the object A5. The collection unit 200 collects time series skill data of the series of operations described above, and stores the time series skill data in the storage apparatus 220.

In comparison to the skill data collected through the object operation procedure of FIG. 10, the skill data collected through the object operation procedure of FIG. 14 is different in an amount of movement of the master robot 610 and the slave robot 620 in the X-axis direction and the Y-axis direction and also in a rotation angle of the master robot 610 and the slave robot 620 about the Z-axis.

The behavior estimation device 300 learns skill data under a plurality of different conditions which is collected by the collection unit 200. Specifically, the behavior estimation device 300 learns that a holding target object may be placed at a different position in the X-axis direction, the Y-axis direction, and the Z-axis direction, based on the skill data collected under the plurality of different conditions described above. The behavior estimation device 300 learns that a distance between the holding surfaces of holding target objects may be different, based on the skill data collected under the plurality of different conditions described above. Further, the behavior estimation device 300 learns that a holding target object may be placed so as to be rotated about the Z-axis, based on the skill data collected under the plurality of different conditions described above.

Figure 15:
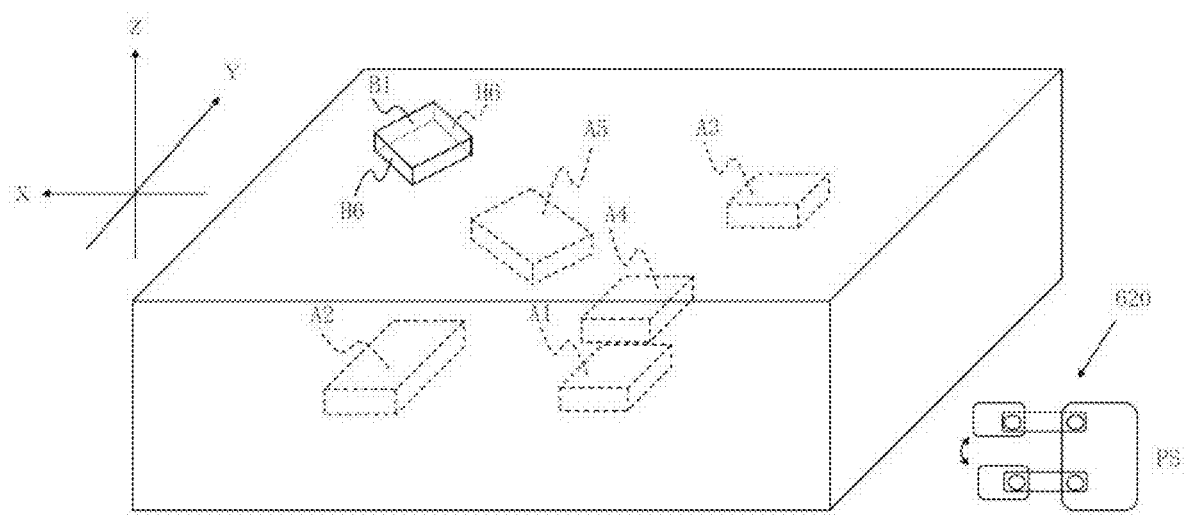
FIG. 15 is a diagram schematically illustrating a state in which the slave robot automatically behaves based on the skill data collected under a plurality of different conditions.

FIG. 15 is a diagram schematically illustrating a state in which the slave robot 620 automatically behaves based on the skill data collected under a plurality of different conditions. In FIG. 15, an object B1 is placed at a different position in the X-axis direction, the Y-axis direction, and the Z-axis direction as compared to any of the objects A1 to A5. The object B1 has a shorter distance between holding surfaces H6 as compared to any of the objects A1 to A5, that is, the object B1 has a different shape. The object B1 is placed in a state in which the object B1 is rotated at a different angle about the Z-axis as compared to any of the objects A1 to A5.

The behavior estimation device 300 moves the slave robot 620 closer to the object B1, based on the skill data suggesting that the object B1 may be placed at a different position in the X-axis direction, the Y-axis direction, and the Z-axis direction as compared to the previously collected positions of the objects A1 to A5 and the response output from the slave robot 620. Subsequently, the behavior estimation device 300 rotates the slave robot 620 about the Z-axis, based on the skill data suggesting that the holding surfaces H6 of the object B1 may be rotated about the Z-axis as compared to the previously collected holding surfaces of the objects A1 to A5 and the response output from the slave robot 620. Subsequently, the behavior estimation device 300 causes the holding parts 624 and 626 of the slave robot 620 to act in a direction in which the holding parts 624 and 626 approach each other. Here, the behavior estimation device 300 causes the holding parts 624 and 626 of the slave robot 620 to act in a direction in which the holding parts 624 and 626 approach each other until the holding parts 624 and 626 of the slave robot 620 come into contact with the holding surfaces H6 of the object B1, based on the skill data suggesting that a distance between the holding surfaces H6 of the object B1 may be different as compared to previously collected distances between the holding surfaces of the objects A1 to A5 and the response output from the slave robot 620. When the holding parts 624 and 626 of the slave robot 620 come into contact with the holding surfaces H6 of the object B1, a reaction force from the object B1 is fed back to the behavior estimation device 300 via the slave robot 620, and the behavior estimation device 300 thereby recognizes that the behavior estimation device 300 has held the object Bl. Subsequently, the behavior estimation device 300 lifts up the object B1 by lifting up the position of the slave robot 620 while holding the object B1.

As described above, according to the behavior estimation apparatus 100 of the present embodiment, AI is constructed by collecting the skill data for a human to remotely operate a robot by using the bilateral system that bidirectionally control the master robot and the slave robot, and performing imitation learning so that human skill is reproduced by using the data. As for the skill data, collecting the skill data under different conditions with different environments, humans, robots and the like, allows AI to be robust against variation of such conditions. The bilateral system performs bidirectional control, and can thus extract human object operation skills of recognizing reaction information from an object and adaptively coping with the reaction information. In particular, in the present embodiment, the collection unit collects the skill data also in consideration of the control delay of the action of the slave robot in response to the operation of the master robot. Thus, when the slave robot is caused to automatically behave, the behavior estimation device can estimate a command value also in consideration of the control delay of the action of the slave robot in response to the operation of the master robot. In the related art, the control system is constructed based on the assumption that the response of the control target object follows the command value without delay (no control delay is generated). However, in actuality, the control target object has a control delay in response to the command value, and thus it is difficult to cause the control target object to automatically behave as desired at a speed close to that of human action.

Thus, in the related art, only such a slow behavior that can tolerate the control delay of the control target object can be implemented. As a result, the automatic behavior of the control target object is significantly slow. In contrast, in the present embodiment, the skill data is collected in consideration of the control delay of the action of the slave apparatus in response to the operation of a master apparatus, and the command value for causing the control target object to automatically behave is estimated by using the skill data. In other words, in the present embodiment, the command value is estimated based on the assumption that the control delay of the control target object is generated, and thus the automatic behavior at a speed close to that of human action can be implemented.

According to the present embodiment, supervised learning is enabled because of the imitation learning, and the number of pieces of skill data to be collected can be reduced. In the present embodiment, a behavior can be determined online instead of reproducing data created offline, an appropriate behavior can be calculated under unknown environments. Specifically, in a case where physical characteristics of an operation target object, such as the shape, mass, and rigidity, are unknown beforehand, a robot in the related art is incapable of proper operation, which makes it inevitable to rely on manpower. According to the present embodiment, such a problem can be solved. Thus, all of the physical labor that requires operations of unknown objects may be assigned to a robot. Specifically, according to the present embodiment, a robot may perform human object operation procedures, such as harvesting or cropping of agricultural work, constructions, picking at a warehouse, cooking, surgery, and doing the laundry, instead of a human. A robot in the related art has an aim of completing a specific task using a dedicated device; however, according to the present embodiment, functions can be implemented by using software instead of a device, and thus a genuine general-purpose robot may be manufactured that carries out a plurality of tasks by itself.

Note that the above description illustrates an example in which the skill data is collected under a plurality of conditions with different placed positions, shapes, rotation angles about the Z-axis, and the like of the operation target object. However, this is not restrictive. For example, the behavior estimation apparatus 100 can collect the skill data of operations performed by different operators. The behavior estimation apparatus 100 can collect the skill data of operations performed by using different master robots and/or slave robots. The behavior estimation apparatus 100 can collect the skill data of operations performed under a state in which the object of the operation target is placed at different rotation angles about the X-axis and/or the Y-axis. The behavior estimation apparatus 100 can collect the skill data under various different conditions. As the number of conditions under which the skill data is collected is increased, the learning of object operation skills to be implemented can be more robust against variation of the conditions.

Modification of Behavior Estimation Apparatus

Figure 16:
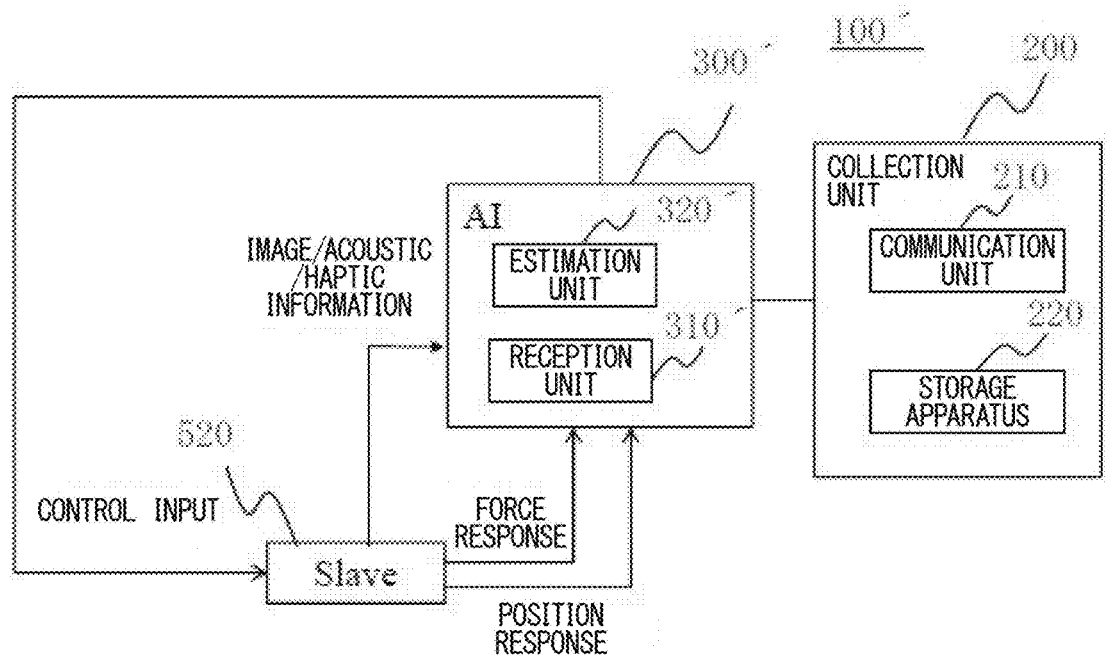
FIG. 16 is a block diagram illustrating a modification of the behavior estimation apparatus.

Next, a modification of the behavior estimation apparatus 100 will be described. FIG. 16 is a block diagram illustrating a modification of the behavior estimation apparatus 100. Description of parts overlapping with those of the behavior estimation apparatus 100 illustrated in FIGS. 1 and 5 will be omitted, and only parts different from those of the behavior estimation apparatus 100 illustrated in FIGS. 1 and 5 will be described.

As compared to the behavior estimation apparatus 100 illustrated in FIGS. 1 and 5, a behavior estimation apparatus 100' according to the modification is different in that the position controller 410 and the force controller 420 are not included. In the behavior estimation apparatus 100' according to the modification, an estimation unit 320' of a behavior estimation device 300' outputs control input for causing the slave robot 520 to automatically behave, based on the skill data received by a reception unit 310', and the position response, the force response, and picture information output from the slave robot 520.

Specifically, the behavior estimation device 300' predicts what control input should be output based on the position response, the force response, and the picture information of the slave robot 520, and performs learning also including the control system. The behavior estimation apparatus 100' according to the modification performs no coordinate conversion and may perform an incomplete control that causes the position control and the force control to be combined in the z-axis; however, this is not a problem as long as the behavior estimation device (AI) 300' creates a control. In a case where the control system need not be designed, the position control and the force control need not be separated in the first place, and thus the behavior estimation device 300' according to the modification can output control input in which the position control and the force control are not separated, based on the skill data collected by the collection unit 200 and the position response, the force response, and the picture information output from the slave robot 520.

Modification of Bilateral System

Note that, in the one embodiment described above, a four-channel-type bilateral system is described as an example of the bilateral system 500. It is known that the four-channel type is a type that has the best control performance. However, the bilateral system is not limited to the four-channel type, and various bilateral systems other than the four-channel type can be used as well.

Figure 17:
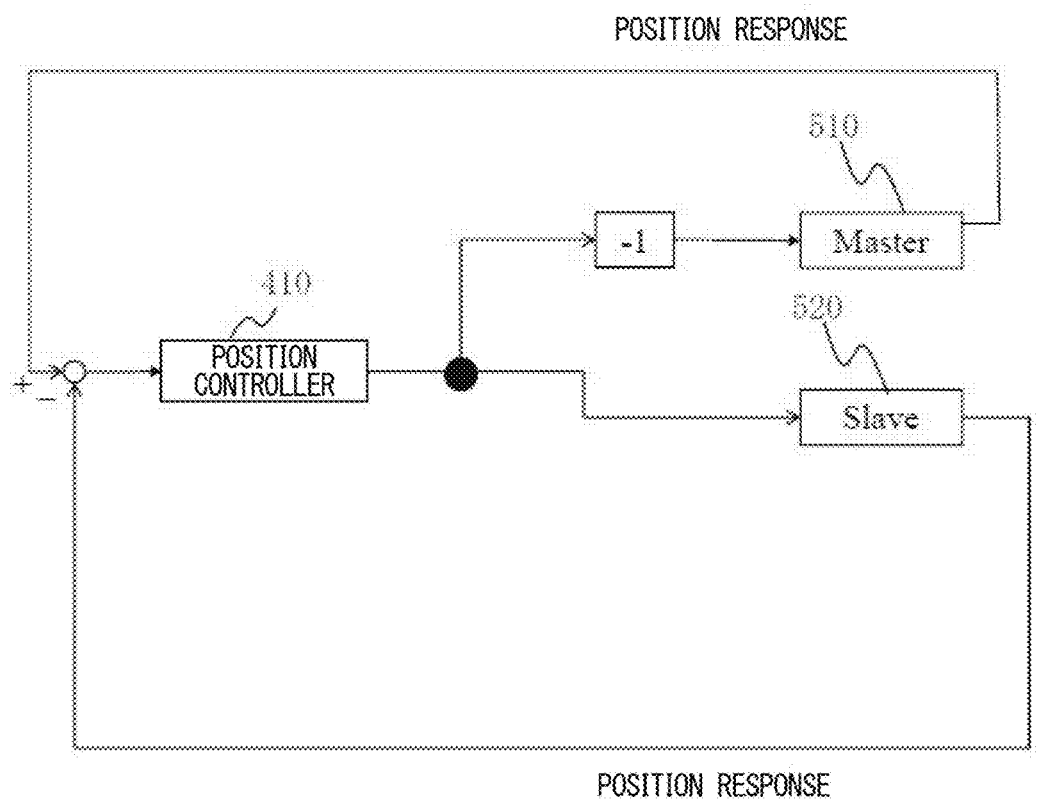
FIG. 17 is a diagram illustrating a position symmetric type bilateral control system.
Figure 18:
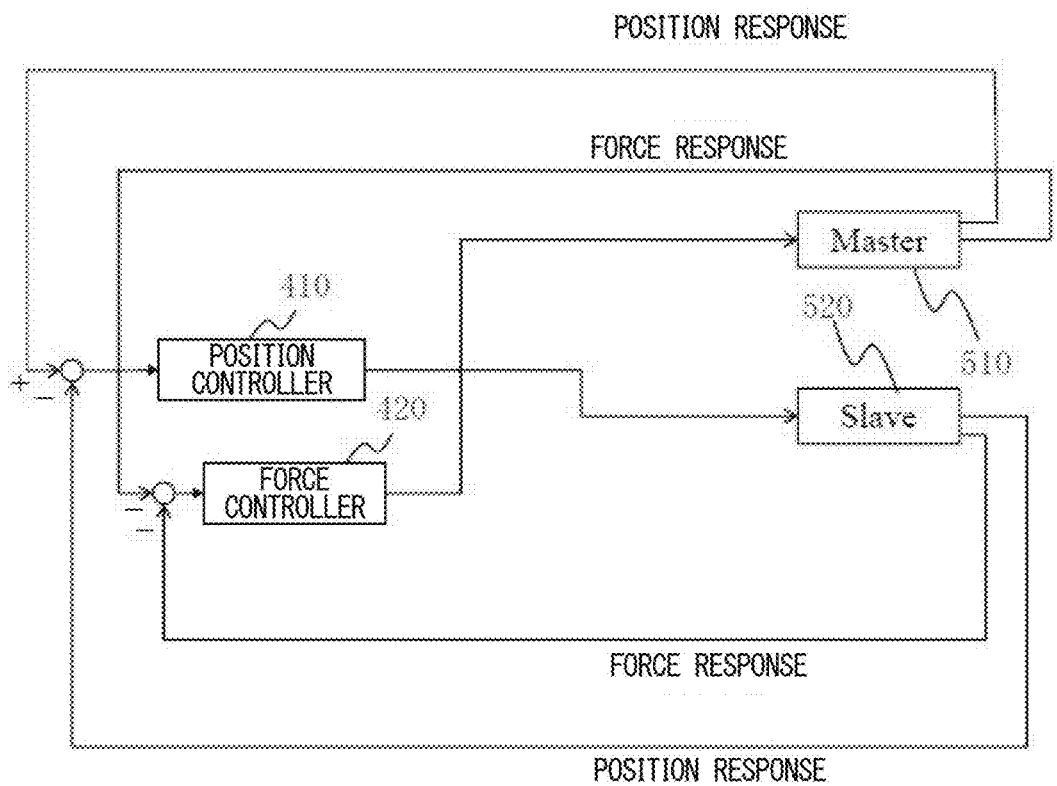
FIG. 18 is a diagram illustrating a force feedback-type bilateral control system.
Figure 19:
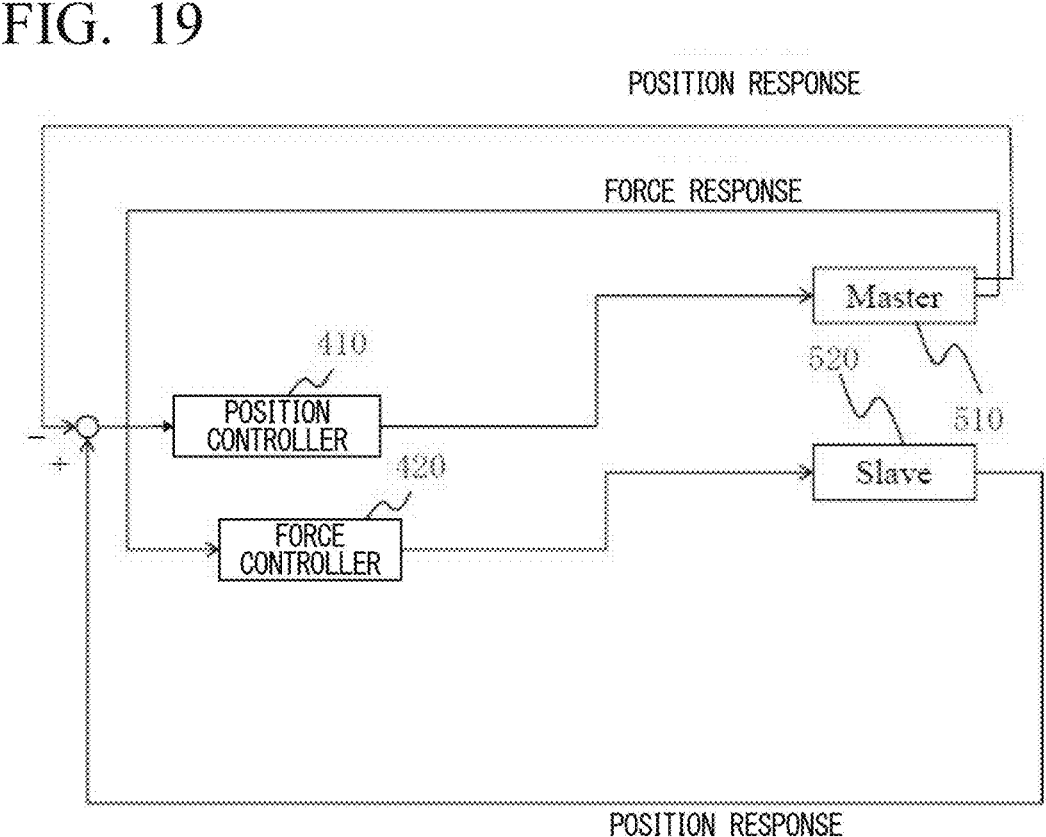
FIG. 19 is a diagram illustrating a force forward-type bilateral control system.
Figure 20:
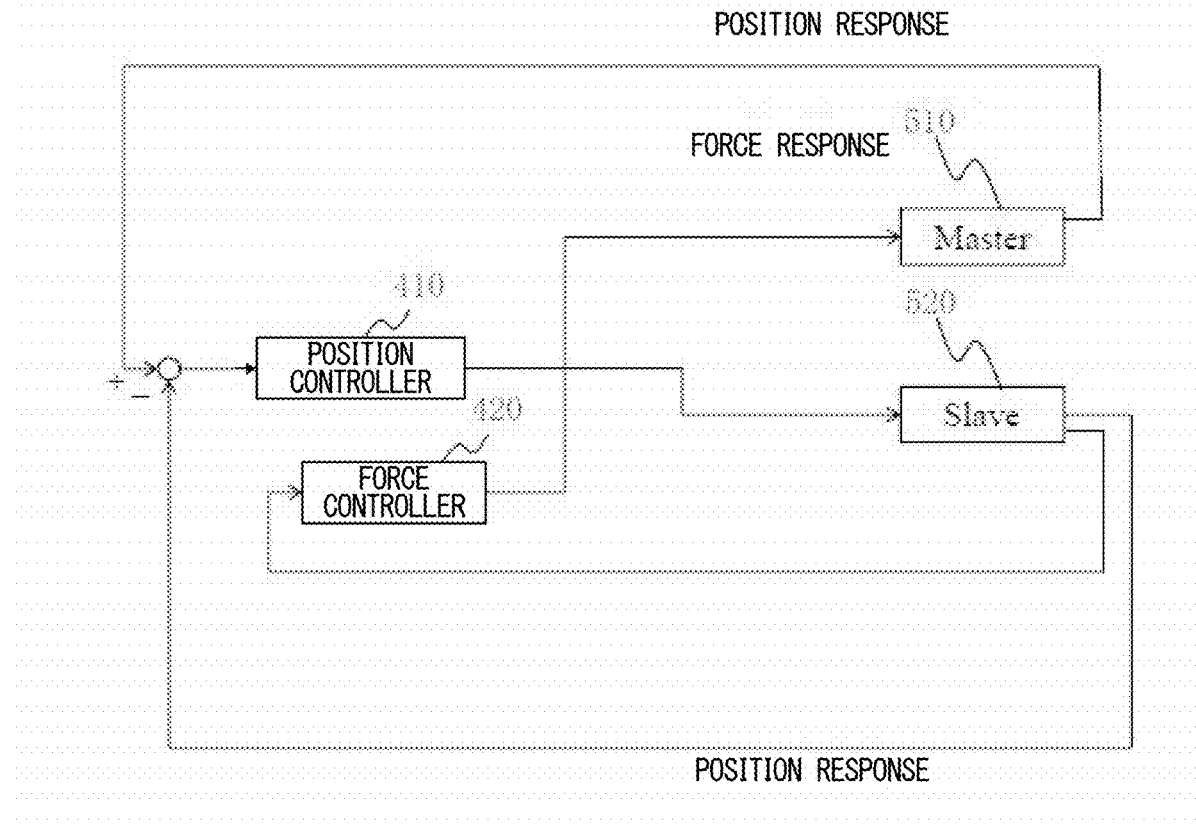
FIG. 20 is a diagram illustrating a force reverse-type bilateral control system.

For example, FIG. 17 to FIG. 20 are each a block diagram illustrating a typical control system other than the four-channel-type bilateral system. FIG. 17 illustrates a position symmetric type bilateral control system. FIG. 18 illustrates a force feedback-type bilateral control system. FIG. 19 illustrates a force forward-type bilateral control system. FIG. 20 illustrates a force reverse-type bilateral control system.

Any of the bilateral systems is a control system in which the control system of the master robot and the slave robot bidirectionally (bilaterally) transmits information. As illustrated in FIGS. 17 to 20, the presence of both of the position control and the force control in the bilateral system is not necessarily required.

Second Specific Example of Behavior Estimation Apparatus

Next, another specific embodiment of the behavior estimation apparatus 100 will be described. The following description will be given by taking a procedure of erasing a line drawn on a paper sheet as an example of the object operation procedure.

Figure 21:
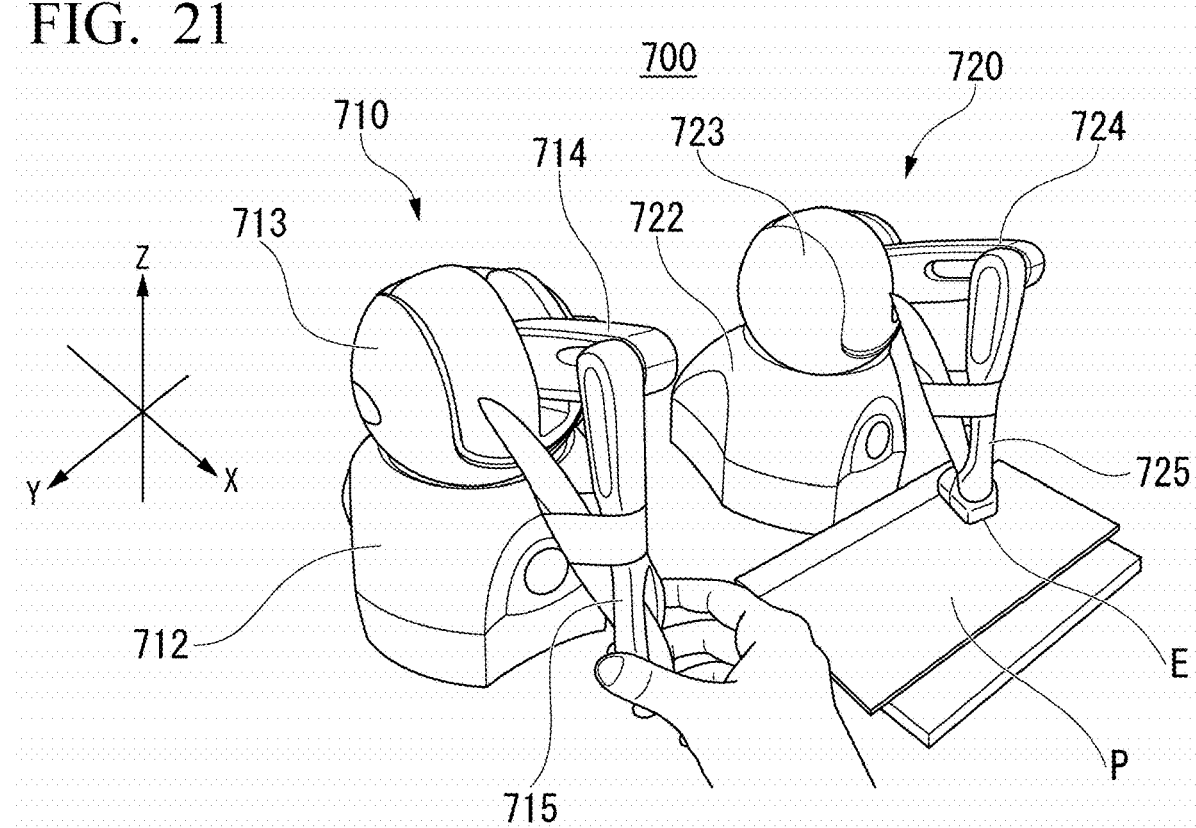
FIG. 21 is a diagram schematically illustrating a bilateral system for performing line erasing by using an eraser.

FIG. 21 is a diagram schematically illustrating a bilateral system for performing line erasing by using an eraser. As illustrated in FIG. 21, a bilateral system 700 for line erasing using an eraser includes a master robot 710 and a slave robot 720.

The master robot 710 includes a base part 712, a rotary part 713 placed on the base part 712, a first arm part 714 coupled to the rotary part 713, and a second arm part 715 coupled to the first arm part 714. The rotary part 713 can be rotated about the Z-axis with respect to the base part 712. The first arm part 714 has its first end portion being coupled to the rotary part 713, and can be rotated about the Y-axis with the first end portion being a fulcrum. As a result, a second end portion of the first arm part 714 can be rotated in the Z-axis direction. The second arm part 715 has its first end portion being coupled to the first arm part 714, and can be rotated about the Y-axis with the first end portion being a fulcrum. As a result, the second end portion of the second arm part 715 can be rotated in the X-axis direction. With this configuration, the operator can perform moving operation in the X, Y, and Z-axis directions by holding the second end portion of the second arm part 715.

The slave robot 720 is configured to act according to action of the master robot 710, and includes a base part 722, a rotary part 723 placed on the base part 722, a first arm part 724 coupled to the rotary part 723, and a second arm part 725 coupled to the first arm part 724. The rotary part 723 can be rotated about the Z-axis with respect to the base part 722. The first arm part 724 has its first end portion being coupled to the rotary part 723, and can be rotated about the Y-axis with the first end portion being a fulcrum. As a result, the second end portion of the first arm part 724 can be rotated in the Z-axis direction. The second arm part 725 has its first end portion being coupled to the first arm part 724, and can be rotated about the Y-axis with the first end portion being a fulcrum. As a result, the second end portion of the second arm part 725 can be rotated in the X-axis direction. An eraser E is attached to the second end portion of the second arm part 725. The eraser E is moved according to the moving operation of the operator performed for the second end portion of the second arm part 715.

By using the bilateral system 700 illustrated in FIG. 21, skill data of line erasing under a plurality of different conditions can be collected. Specifically, a paper sheet P on which a line is drawn is placed below the second arm part 725, and the height of the paper sheet P in the Z-axis direction can be adjusted. In the present embodiment, under a state in which the height of the paper sheet P is adjusted to 20 mm, the operator first performs moving operation of holding and lowering the second end portion of the second arm part 715 in the Z-axis direction. When the eraser E attached to the second end portion of the second arm part 725 comes into contact with the paper sheet P, a reaction force from the paper sheet P is fed back to the master robot 710 via the slave robot 720, and the operator thereby recognizes that the eraser E has come into contact with the paper sheet P. Subsequently, the operator performs operation of moving the second end portion of the second arm part 715 in the X-axis and Y-axis directions with the eraser E remaining in contact with the paper sheet P. In this manner, the operator performs the operation of erasing the line drawn on the paper sheet P by using the eraser E. The collection unit 200 collects time series skill data of the series of operations described above, and stores the time series skill data in the storage apparatus 220.

In the present embodiment, the operation of line erasing using the eraser E as described above is similarly performed also under states in which the height of the paper sheet P is adjusted to 50 mm and 80 mm.

The behavior estimation device 300 learns skill data under a plurality of different conditions which is collected by the collection unit 200. Specifically, the behavior estimation device 300 learns that the height of the paper sheet P may be set at a different position in the Z-axis direction, based on the skill data collected under the plurality of different conditions described above.

Figure 22:
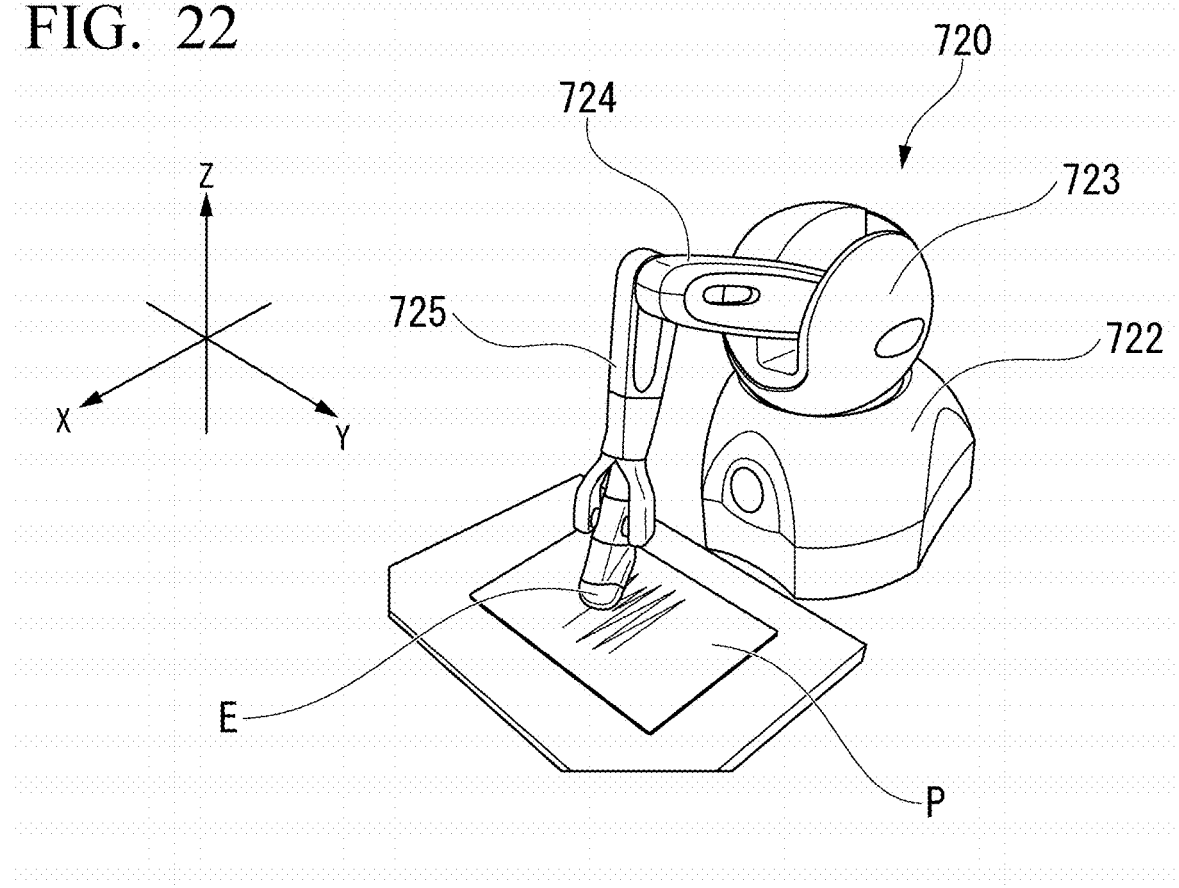
FIG. 22 is a diagram schematically illustrating a state in which the slave robot automatically behaves based on the skill data collected under a plurality of different conditions.

FIG. 22 is a diagram schematically illustrating a state in which the slave robot 720 automatically behaves based on the skill data collected under a plurality of different conditions. In FIG. 22, the height of the paper sheet P is adjusted to 35 mm, which is not set at the time of learning of the object operation skills. First, the behavior estimation device 300 performs moving operation of lowering the eraser E in the Z-axis direction. Here, the behavior estimation device 300 performs the moving operation of lowering the eraser E in the Z-axis direction until the eraser E comes into contact with the paper sheet P, based on the previously collected skill data suggesting that the height of the paper sheet P may be set at a different position in the Z-axis direction and the response output from the slave robot 720. When the eraser E comes into contact with the paper sheet P, a reaction force from the paper sheet P is fed back to the behavior estimation device 300 via the slave robot 720, and the behavior estimation device 300 thereby recognizes that the eraser E has come into contact with the paper sheet P. Subsequently, the behavior estimation device 300 performs operation of erasing the line drawn on the paper sheet P by performing operation of moving the eraser E in the X-axis and Y-axis directions with the eraser E remaining in contact with the paper sheet P.

Figure 23:
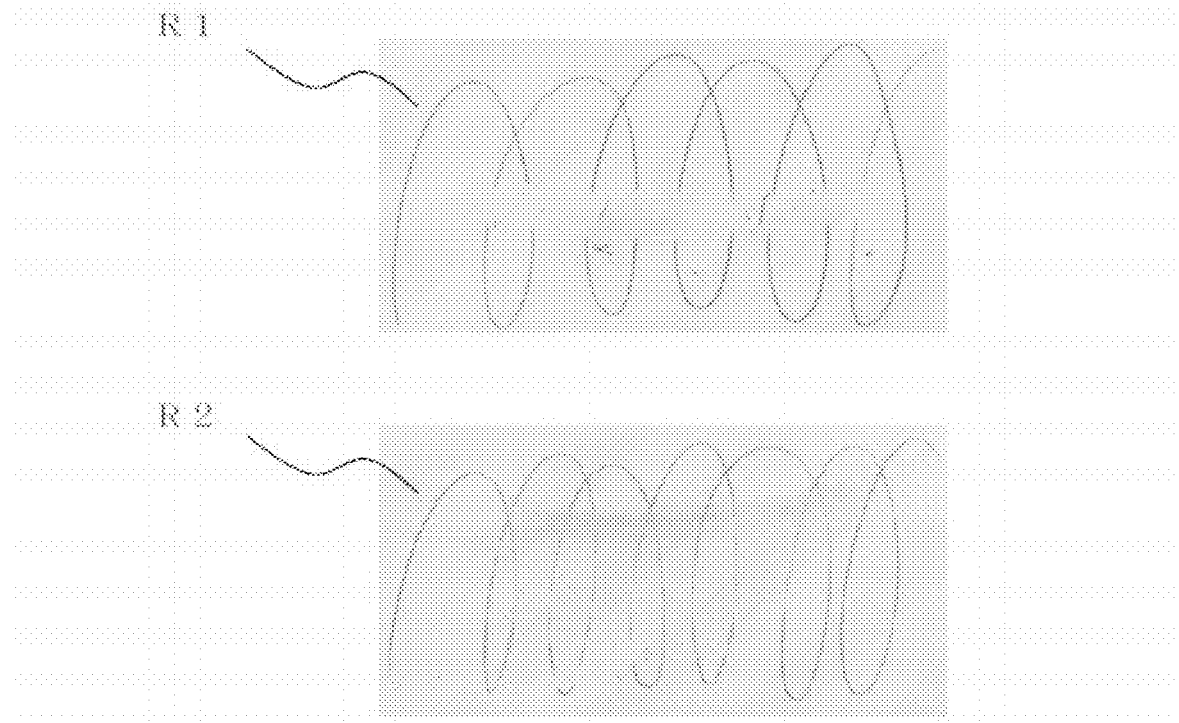
FIG. 23 is a diagram illustrating results obtained when the slave robot is caused to automatically behave under a state in which the height of a paper sheet is adjusted to 65 mm.

In the specific example, the slave robot 720 is caused to automatically behave similarly also under a state in which the height of the paper sheet P is adjusted to 65 mm. FIG. 23 is a diagram illustrating results obtained when the slave robot 720 is caused to automatically behave under a state in which the height of the paper sheet P is adjusted to 65 mm. In FIG. 23, R1 shows results of line erasing obtained when the slave robot 720 automatically behaves under a state in which the bilateral control system using the position response and the force response as illustrated in FIG. 5 is applied to the bilateral system 700. R2 shows results of line erasing obtained when the slave robot 720 automatically behaves under a state in which the position symmetric type bilateral control system as illustrated in FIG. 17, that is, the bilateral control system not using the force response, is applied to the bilateral system 700. As illustrated in FIG. 23, according to the behavior estimation device 300 of the present embodiment, the line drawn on the paper sheet P can be erased in a prescribed range also at the height of the paper sheet P that is not experienced at the time of learning of the object operation skills. Comparison between R1 and R2 of FIG. 23 shows that, by applying the bilateral control system using both of the position response and the force response, the line can be erased more securely than the case where the bilateral control system using only the position response is applied. Specifically, when the bilateral control system using only the position response is applied, force information is not provided as teaching data, and hence the force of pressing down the paper sheet P by using the eraser E may be decreased, or conversely, increased. In contrast, when the bilateral control system using both of the position response and the force response is applied, the force is fed back as well, and hence the line erasing can be flexibly performed according to the variation of the height of the paper sheet P.

Third Specific Example of Behavior Estimation Apparatus

Next, another specific embodiment of the behavior estimation apparatus 100 will be described. The following description will be given by taking a procedure of drawing a line by using a ruler and a protractor as an example of the object operation procedure.

A bilateral system used in the object operation procedure is similar to the bilateral system 700 illustrated in FIG. 21, and thus detailed description thereof will be omitted. Note that, in the present embodiment, a pencil is attached to the second end portion of the second arm part 725, instead of the eraser E.

Figure 24:
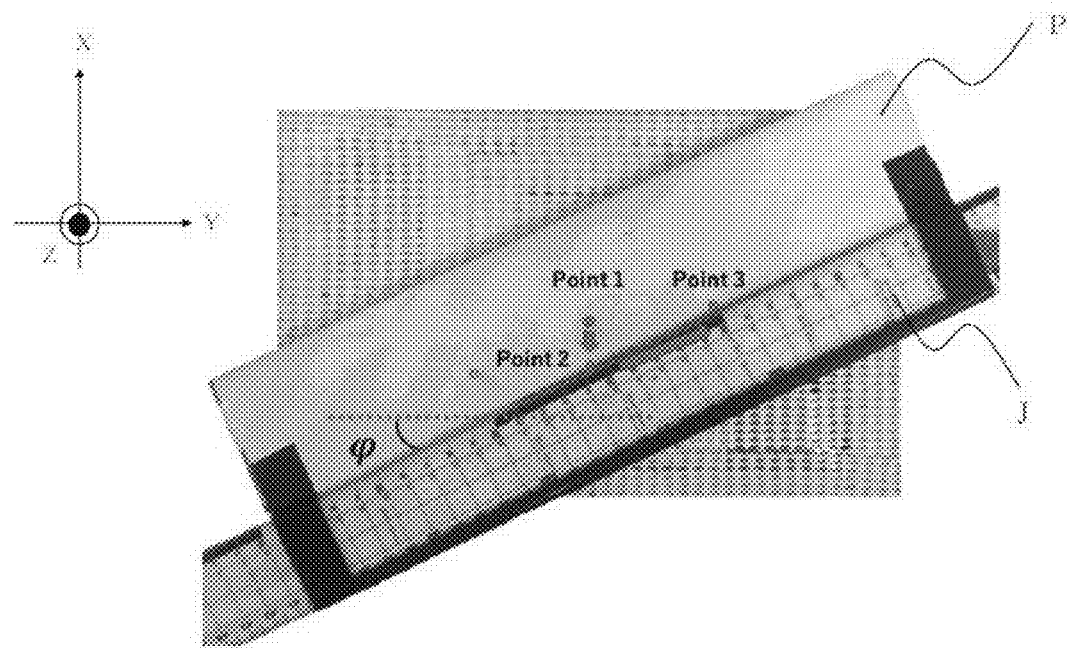
FIG. 24 is a diagram for describing collection of the skill data of line drawing and automatic behavior of the line drawing.

FIG. 24 is a diagram for describing collection of the skill data of line drawing and automatic behavior of the line drawing. As illustrated in FIG. 24, a paper sheet P and a ruler J are placed below the second arm part 725. In the present embodiment, first, the skill data is collected under a state in which an angle φ of the ruler J is adjusted to 0°. For example, under the state in which the angle φ of the ruler J is adjusted to 0°, the operator performs moving operation of holding and lowering the second end portion of the second arm part 715 in the Z-axis direction. When the pencil attached to the second end portion of the second arm part 725 comes into contact with Point 1 of the paper sheet P, a reaction force from the paper sheet P is fed back to the master robot 710 via the slave robot 720, and the operator thereby recognizes that the pencil has come into contact with the paper sheet P. Subsequently, the operator performs operation of moving the second end portion of the second arm part 715 in a direction of the ruler J along the X-axis with the pencil remaining in contact with the paper sheet P. When the pencil comes in contact with the ruler J at Point 2 of the paper sheet P, a reaction force from the ruler J is fed back to the master robot 710 via the slave robot 720, and the operator thereby recognizes that the pencil has come into contact with the ruler J. Subsequently, the operator performs operation of moving the second end portion of the second arm part 715 such that the pencil moves along the ruler J with the pencil remaining in contact with paper sheet P. In other words, the operator performs operation of moving the second end portion of the second arm part 715 while feeling a reaction force from the paper sheet P and the ruler J. When the pencil moves to Point 3 of the paper sheet P, the operator performs moving operation of raising the second end portion of the second arm part 715 in the Z-axis direction. The collection unit 200 collects time series skill data of the series of operations described above, and stores the time series skill data in the storage apparatus 220.

In the present embodiment, the operation of line drawing using the pencil as described above is similarly performed also under states in which the angle φ of the ruler J is adjusted to 30° and 60°. In the present embodiment, the collection of the skill data described above is performed five times under each of the states in which the angle φ of the ruler J is set to 0°, 30°, and 60°.

The behavior estimation device 300 learns skill data under a plurality of different conditions which is collected by the collection unit 200. Specifically, the behavior estimation device 300 learns to lower the pencil to Point 1 of the paper sheet P, move the pencil in the X-axis direction from Point 1, and move the pencil along the ruler J when the pencil comes into contact with the ruler J, based on the skill data collected under the plurality of different conditions described above. The behavior estimation device 300 learns that the angle φ of the ruler J may be set to a different angle about the Z-axis, based on the skill data collected under the plurality of different conditions described above.

Next, the slave robot 720 is caused to perform automatic behavior of line drawing under states in which the angle φ of the ruler J is set to 15° and 45°, which is not set at the time of learning of the object operation skills. As a result, first, the behavior estimation device 300 performs moving operation of lowering the pencil toward Point 1 of the paper sheet P. When the pencil comes into contact with the paper sheet P, a reaction force from the paper sheet P is fed back to the behavior estimation device 300 via the slave robot 720, and the behavior estimation device 300 thereby recognizes that the pencil has come into contact with the paper sheet P. Subsequently, the behavior estimation device 300 performs operation of moving the pencil in the X-axis direction with the pencil remaining in contact with the paper sheet P. When the pencil comes into contact with the ruler J, a reaction force from the ruler J is fed back to the behavior estimation device 300 via the slave robot 720, and the behavior estimation device 300 thereby recognizes that the pencil has come into contact with the ruler J. Subsequently, the behavior estimation device 300 performs operation of moving the pencil along the ruler J with the pencil remaining in contact with the paper sheet P and the ruler J. When the behavior estimation device 300 moves the pencil along the ruler J by a prescribed distance, the behavior estimation device 300 performs moving operation of raising the pencil in the Z-axis direction. As a result of the series of automatic behavior, the slave robot 720 is enabled to draw a line along the ruler J under the states in which the angles are 15° and 45°, which is not set at the time of learning of the object operation skills. Note that the present embodiment illustrates an example in which the pencil is first lowered to Point 1 of the paper sheet P and then the pencil is moved in the X-axis direction from Point 1 to cause the pencil to come into contact with the ruler J (to move to Point 2). However, this is not restrictive. For example, it is also conceivable that, with the use of the image sensor (camera) of the slave robot 720, the pencil is first lowered to Point 2 of the paper sheet P (position to come into contact with the ruler J) and then a line is drawn along the ruler J from Point 2.

Figure 25:
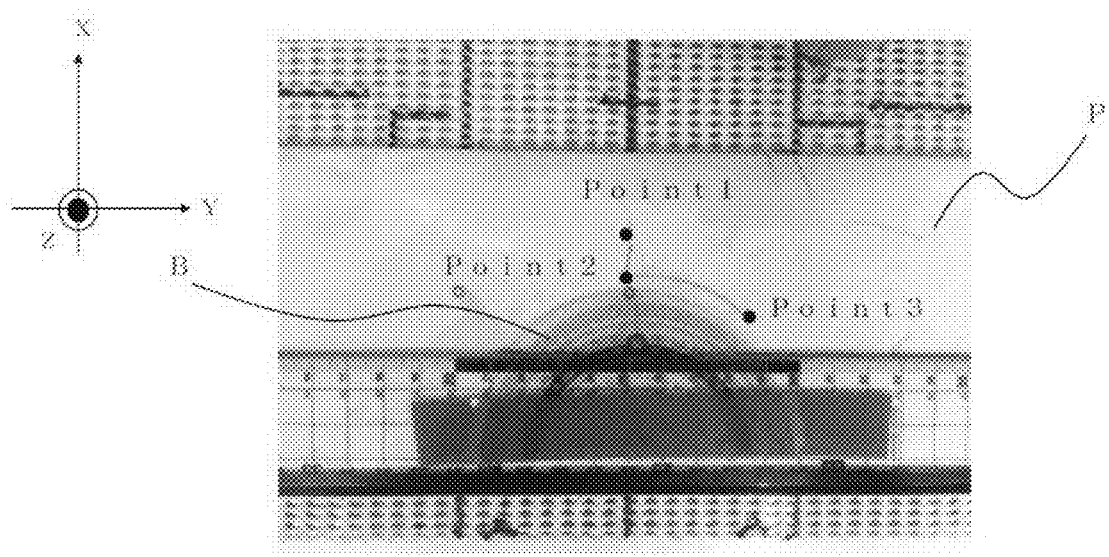
FIG. 25 is a diagram illustrating results obtained when the slave robot draws an arc along a curved surface of a protractor in automatic behavior.

Further, the slave robot 720 is enabled to draw an arc along a protractor which is not used at the time of learning of the object operation skills. FIG. 25 is a diagram illustrating results obtained when the slave robot 720 draws an arc along a curved surface of the protractor in automatic behavior. As illustrated in FIG. 25, the behavior estimation device 300 is enabled to first lower the pencil to Point 1 of the paper sheet P, move the pencil toward a protractor B in the X-axis direction, and draw an arc to Point 3 along the curved surface of the protractor B when the pencil comes into contact with the protractor B at Point 2 of the paper sheet P. Regarding this operation, it is assumed that the behavior estimation device (AI) 300 has autonomously learned to move in a normal direction of a reaction force from an instrument (ruler, protractor) even if the instrument is the protractor B which the behavior estimation device 300 experiences for the first time because the behavior estimation device (AI) 300 implicitly learned to draw a line in a normal direction of a force vector that is generated when the pencil is pressed against the instrument of line drawing after the pencil has come into contact with the instrument during the object operation of line drawing.

As described above, according to the present embodiment, even when the ruler J is set to an unknown angle φ that is not set at the time of learning of the object operation skills, the behavior estimation device 300 is enabled to draw a line along the ruler J in the automatic behavior. In addition to the above, according to the present embodiment, the behavior estimation device 300 is enabled to draw a curved line in the automatic behavior along an unknown object of the protractor B, which is not used at the time of learning of the object operation skills.

Modification of Behavior Estimation Apparatus

Figure 26:
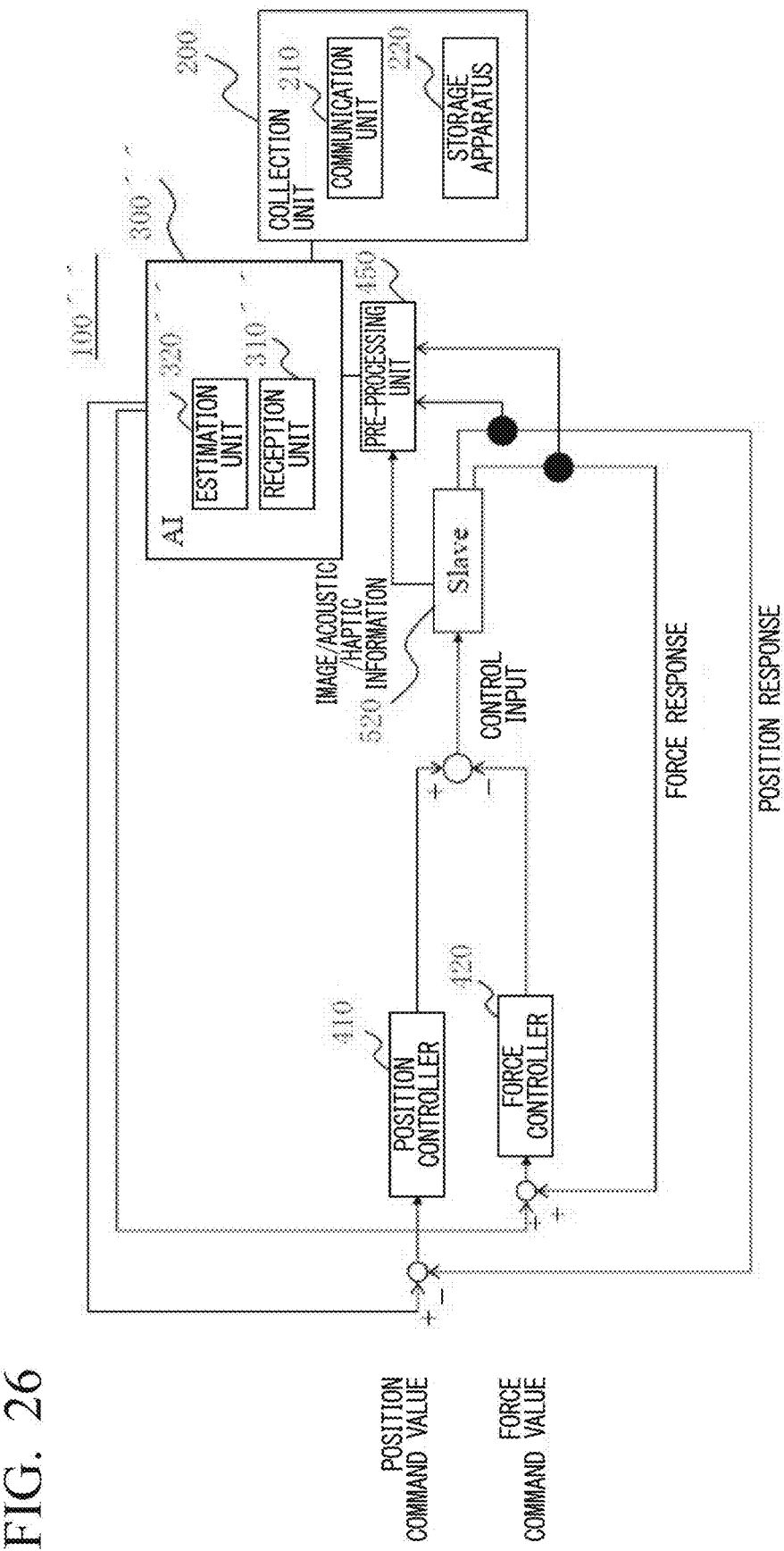
FIG. 26 is a block diagram illustrating a modification of the behavior estimation apparatus.

Next, a modification of the behavior estimation apparatus 100 will be described. FIG. 26 is a block diagram illustrating a modification of the behavior estimation apparatus 100. Description of parts overlapping with those of the behavior estimation apparatus 100 illustrated in FIGS. 1 and 5 will be omitted, and only parts different from those of the behavior estimation apparatus 100 illustrated in FIGS. 1 and 5 will be described.

As compared to the behavior estimation apparatus 100 illustrated in FIGS. 1 and 5, a behavior estimation apparatus 100" according to the modification is different in that the behavior estimation apparatus 100" further includes a pre-processing unit 450. The pre-processing unit 450 performs pre-processing on the position response, the force response, and the image/acoustic/haptic information output from the slave robot 520. Specifically, a behavior estimation device 300" (object operation AI) according to the present embodiment is a device that estimates an appropriate command value when the behavior estimation device 300" receives input of an angle, an angular speed, torque, and the like. The angle, the angular speed, and the torque, however, have different dimensions, and thus when the slave robot 720 as described with reference to FIGS. 21 and 22 and other figures is used, an angle command value from approximately 0 to 1 rad and a torque command value from approximately 100 to 1000 mN·m are input. The behavior estimation device 300" (AI) cannot understand physical meanings of the numerical values, and can only understand that the input of such numerical values ranges from 0 to 1 and ranges from 100 to 1000. In this case, the behavior estimation device 300" (AI) may consider only the influence of significantly varying numerical values. Specifically, when the slave robot 720 as described with reference to FIGS. 21 and 22 and other figures is used, the behavior estimation device 300" may consider only the influence of torque that significantly varies from 100 to 1000 and may thus not be able to estimate an appropriate command value.

Figure 27:
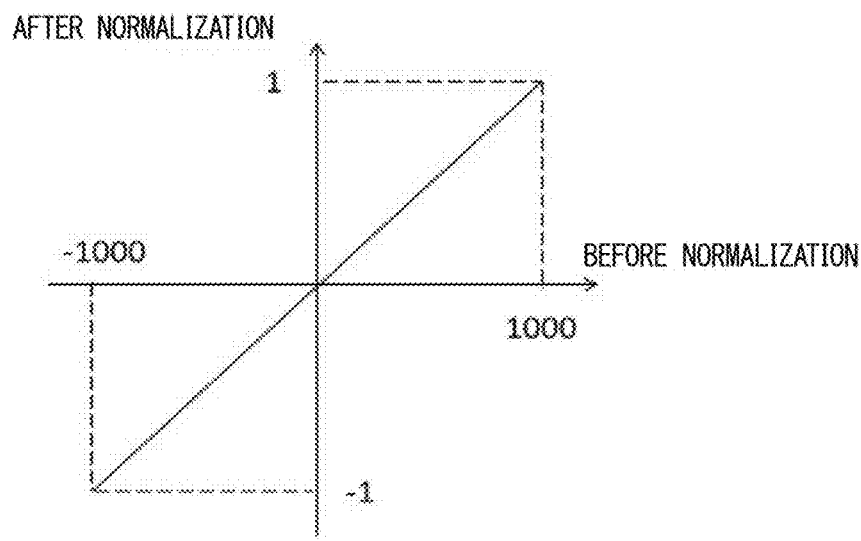
FIG. 27 is a diagram illustrating an example of normalization performed by a pre-processing unit.

In view of this, the pre-processing unit 450 performs normalization processing as an example of pre-processing for such physical quantities in different dimensions that are output from the slave robot 520, and outputs a normalized value to the behavior estimation device 300". To take one example, the normalization refers to the following processing: a value of each parameter is converted into a value within a range from a minimum value 0 to a maximum value 1 by converting a numerical value according to an equation of dn=(d−dmin)/(dmax−dmin), where d represents each parameter, dn represents each parameter after normalization, dmax represents a maximum value of each parameter, and dmin represents a minimum value of each parameter. FIG. 27 is a diagram illustrating an example of normalization performed by the pre-processing unit 450. As illustrated in FIG. 27, in one example, when the pre-processing unit 450 receives input of a parameter that ranges from −1000 to 1000, the pre-processing unit 450 can normalize the value into a range from −1 to 1 and output the normalized value. By providing the pre-processing unit 450, even if there is a difference in the dimensions of input physical quantities, the physical quantities can be converted so as to have the same magnitude of variation, and the behavior estimation device 300" can thus estimate an appropriate command value.

Figure 28:
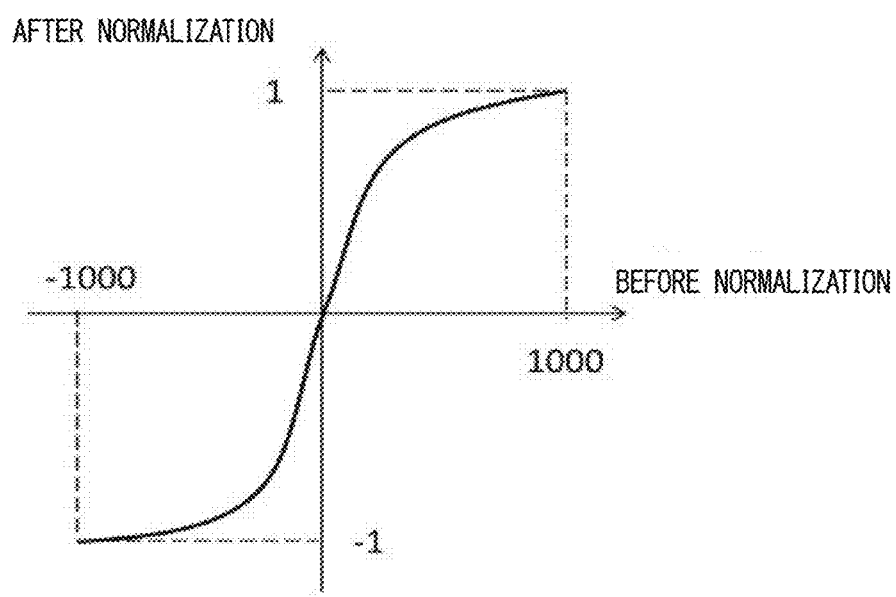
FIG. 28 is a diagram illustrating an example of normalization performed by the pre-processing unit.

The pre-processing unit 450 can perform the normalization of the force response output from the slave robot 520 such that variation of the value after the normalization corresponding to the variation in the first range of the force response is larger than variation of the value after the normalization corresponding to the variation in the second range which is larger than the first range. FIG. 28 is a diagram illustrating an example of normalization performed by the pre-processing unit 450. As illustrated in FIG. 28, in the first range from 0 to 500, for example, the pre-processing unit 450 has a large variation of the value after normalization corresponding to a prescribed variation of the force response, and in the second range from 501 to 1000, for example, the pre-processing unit 450 has a small variation of the value after normalization corresponding to the same prescribed variation of the force response. This is because granularity of the required force is different depending on a type of the object operation performed by the slave robot 520. For example, when a significantly fragile object is to be operated, a difference of force of several newtons may cause a completely different result such as damage to the object. In contrast, when the object operation is an object operation of lifting up a dumbbell which requires exertion of a force of several hundreds of newtons, there is hardly a particular difference in the results even if there is a difference of a force of several newtons. In contrast, in a case of the angle, for example, a command value for changing from 0 rad to 0.1 rad does not have a significant physical difference from a command value for changing from 1 rad to 1.1 rad. In the image information as well, an operation in which a roughly black image is slightly brightened and an operation in which a roughly white image is slightly brightened do not have a significant difference. That it, "variation of a small numerical value and variation of a large numerical value" does not have a different meaning until when the force is handled as input and output.

In view of this, as illustrated in FIG. 27, for example, the pre-processing unit 450 performs, on the position response and the image/acoustic/haptic information output from the slave robot 520, normalization of converting a parameter with an equal weight, the parameter ranging from a small value to a large value, and whereas, as illustrated in FIG. 28, for example, the pre-processing unit 450 performs, on the force response output from the slave robot 520, normalization that can more significantly take into consideration the influence of variation of a small force. With this configuration, the behavior estimation device 300" can more significantly evaluate variation of a small force than variation of a large force.

Note that FIG. 26 illustrates an example in which the pre-processing unit 450 performs the normalization processing for the position response, the force response, and the image/acoustic/haptic information output from the slave robot 520. However, the present embodiment is not limited to this example. For example, the pre-processing unit 450 can also perform the normalization for the position command value and the force command value output from the behavior estimation device 300" or the position control input and the force control input to be input to the slave robot 520.

The above description illustrates an example in which the pre-processing unit 450 changes weights of conversion according to the intensity of the force response. However, instead of the intensity of the force response, the pre-processing unit 450 can perform the normalization such that the variation of the value after normalization corresponding to long-term variation of the force response and the variation of the value after normalization corresponding to short-term variation are different from each other. In other words, the pre-processing unit 450 can use different weights for the force similar to an offset added in a long term and for the force that varies in a short term. For example, the force that varies in a long term refers to a relatively large force that acts as a restriction for the action and causes a robot to remain in a certain motion state, such as a force for supporting the weight of the robot, a minimum necessary force for maintaining a contact force with the paper sheet, and a minimum necessary force for maintaining contact with the ruler. The force that varies in a short term refers to a force corresponding to fine variation in a certain motion state, such as a force for determining the light and the shade of the line, and a force for adjusting a friction force with respect to the ruler and the paper sheet.

Figure 29:
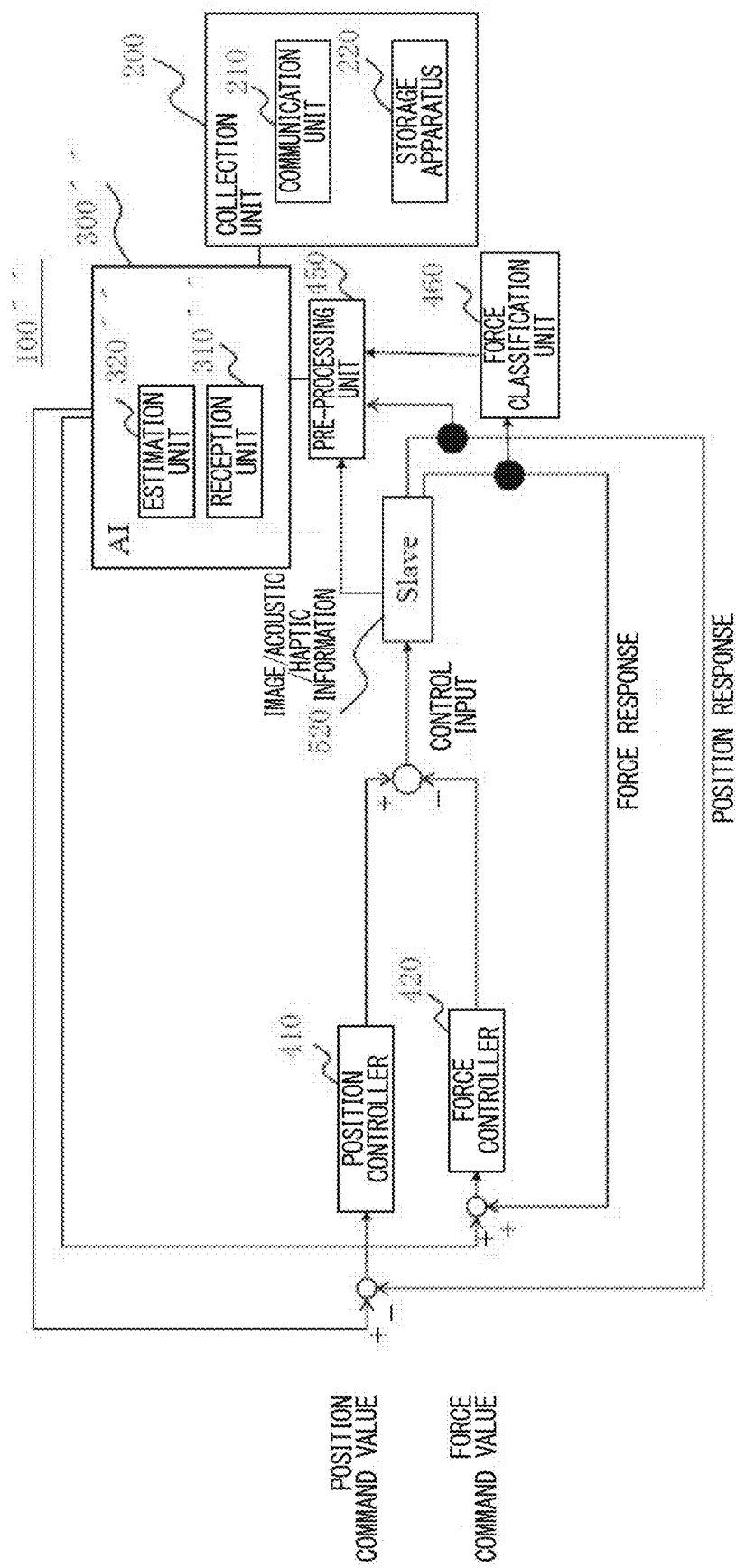
FIG. 29 is a block diagram illustrating a modification of the behavior estimation apparatus.

FIG. 29 is a block diagram illustrating a modification of the behavior estimation apparatus 100. Description of parts overlapping with those of the behavior estimation apparatus 100" illustrated in FIG. 26 will be omitted, and only parts different from those of the behavior estimation apparatus 100" illustrated in FIG. 26 will be described. As compared to the behavior estimation apparatus 100" illustrated in FIG. 26, the modification of FIG. 29 is different in that further a force classification unit 460 is further included.

The force classification unit 460 receives the force response output from the slave robot 520, and classifies the received force response into a plurality of force responses according to the magnitude of the received force response. For example, when the force classification unit 460 receives a parameter of force that ranges from 100 to 1000, the force classification unit 460 classifies the parameter ranging from 100 to 500 into a first force (small force), classifies the parameter ranging from 501 to 1000 into a second force (large force) which is larger than the first force, and outputs the results to the pre-processing unit 450. In this case, the pre-processing unit 450 can perform normalization for each of the plurality of force responses classified by the force classification unit 460. In other words, the pre-processing unit 450 can handle a small force response and a large force response as completely separate inputs. By increasing the number of inputs as described above, the pre-processing unit 450 need not perform complicated normalization, and can use simple normalization as illustrated in FIG. 27, for example. Note that FIG. 29 illustrates an example in which the force classification unit 46 classifies the force response output from the slave robot 520 into a plurality of force responses according to the magnitude of the force response. However, this is not restrictive. The force classification unit 46 can also classify at least any one of the force command value output from the behavior estimation device 300" or the force control input to be input to the slave robot 520 into a plurality of force command values and force control inputs according to the magnitude of the force command value or the force control input. In this manner, the plurality of force responses, force command values, or force control inputs classified by the force classification unit 450 can be handled as different force responses, force command values, or force control inputs.

In this manner, by classifying the force response output from the slave robot 520 into a plurality of responses, handling the force responses as separate pieces of information in the first place, and thereby increasing the number of inputs to the pre-processing unit 450 and the behavior estimation device 300", AI can be created that reacts to each of the force responses in a completely different manner.

The example of FIG. 1 illustrates an example in which the collection unit 200 collects the position response and the force response output from the master robot 510 as the skill data. However, the present embodiment is not limited thereto. The collection unit 200 can collect the force response output from the master robot 510, the force response being classified into a plurality of pieces of skill data according to the magnitude of the force response. For example, the collection unit 200 can collect the force response output from the master robot 510, the force response being classified into the small force response and the large force response. In this case, the collection unit 200 can collect the small force response and the position response and the image/acoustic/haptic information corresponding to the small force response as first skill data, and can also collect the large force response and the position response and the image/acoustic/haptic information corresponding to the large force response as second skill data.

For example, the collection unit 200 first collects the first skill data related to the small force response and causes the behavior estimation device 300 to learn the first skill data. Next, the collection unit 200 collects the second skill data related to the large force response and causes the behavior estimation device 300 to learn the second skill data. The behavior estimation device 300 learns the first skill data and the second skill data that are collected and merged, and is thereby capable of handling forces from the small force to the large force. Collecting the skill data related to the small force response refers to, for example, collecting skill data related to the object operation procedure such as drawing a light line and lightly erasing a line with an eraser. Collecting the skill data related to the large force response refers to, for example, collecting skill data related to the object operation procedure such as drawing a solid line and strongly erasing a line with an eraser.

Figure 30:
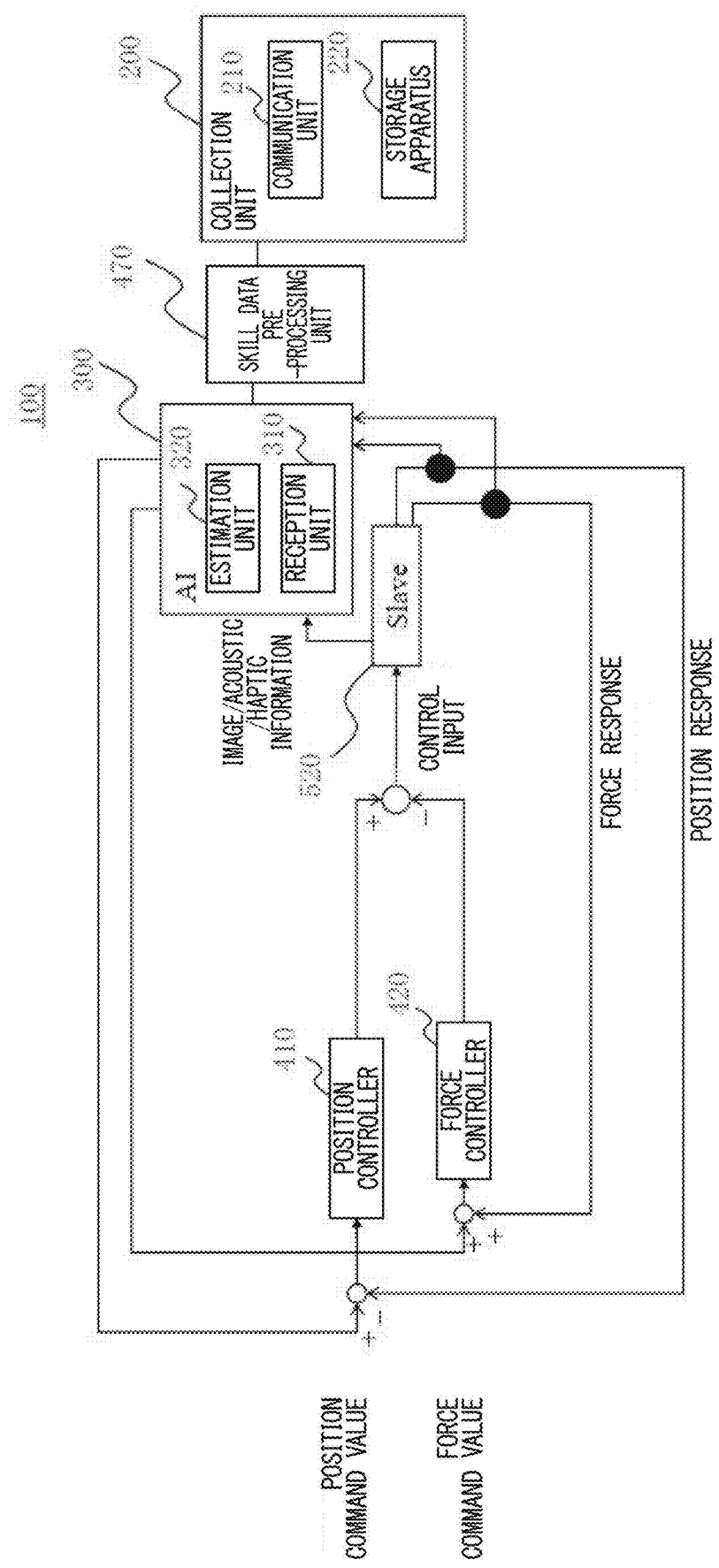
FIG. 30 is a block diagram illustrating a modification of the behavior estimation apparatus.

Next, pre-processing for the skill data will be described. FIG. 30 is a block diagram illustrating a modification of the behavior estimation apparatus 100. Description of parts overlapping with those of the behavior estimation apparatus 100 illustrated in FIG. 5 will be omitted, and only parts different from those of the behavior estimation apparatus 100 illustrated in FIG. 5 will be described. The behavior estimation apparatus 100 of FIG. 30 includes a skill data pre-processing unit 470 that performs pre-processing on the skill data.

The skill data pre-processing unit 470 reads the skill data collected by the collection unit 200, and generates decimated skill data by sampling the read skill data at a frequency according to an operation frequency of the slave robot 520 (control target object). The skill data pre-processing unit 470 transmits the generated decimated skill data to the behavior estimation device 300. The skill data pre-processing unit 470 can generate the decimated skill data by sampling each of the position information, the force information, the image information, the acoustic information, and the haptic information included in the skill data collected by the collection unit 200 at a frequency according to the operation frequency of the slave robot 520 (control target object).

Here, the frequency according to the operation frequency of the slave robot 520 is a frequency that is approximately from 5 to 100 times as high as the operation frequency of the slave robot 520, and more preferably is a frequency that is approximately from 20 to 50 times as high as the operation frequency of the slave robot 520. This will be described by taking as an example of the bilateral system (FIG. 21 and FIG. 22) for performing the line erasing by using an eraser. In the bilateral system of FIG. 21 and FIG. 22, the slave robot 720 causes the eraser E to move and reciprocate in the Y-axis direction twice a second. Specifically, the operation frequency of the slave robot 720 in the Y-axis direction is 2 Hz. In this case, the frequency according to the operation frequency of the slave robot 720 is from 10 Hz to 200 Hz, and more preferably, from 40 Hz to 100 Hz.

Figure 31:
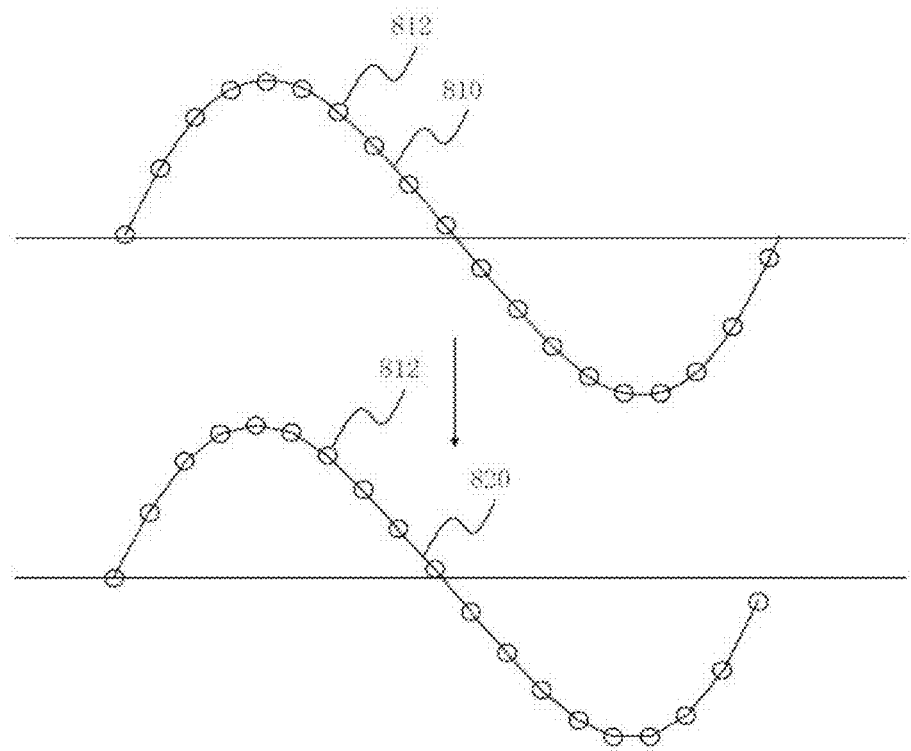
FIG. 31 is a diagram for describing a concept of sampling processing of a skill data pre-processing unit.

Next, a concept of processing of the skill data pre-processing unit 470 will be described. FIG. 31 is a diagram for describing a concept of sampling processing of the skill data pre-processing unit. The skill data pre-processing unit 470 generates decimated skill data 820 by performing sampling at a prescribed frequency on original skill data 810 collected by the collection unit 200, that is, by collecting pieces of skill data at plurality of sampling points 812 that are marked with circles. The decimated skill data 820 is data obtained by connecting the sampling points 812 using a straight line, and it can be seen that the general form of the decimated skill data 820 is substantially the same as that of the original skill data 810.

The behavior estimation device 300 estimates the command value for causing the slave robot 520 (control target object) to automatically behave, based on the decimated skill data 820 transmitted from the skill data pre-processing unit 470 and the response output from the slave robot 520 (control target object).

According to the present embodiment, a processing load and costs of the behavior estimation device 300 can be reduced, and a correct command value can be obtained. Specifically, in a case where the original skill data 810 collected by the collection unit 200 is dense, in a case where the original skill data 810 is directly used, a load of processing of estimating the command value performed by the behavior estimation device 300 for causing the control target object to automatically behave is increased, and thus costs of the behavior estimation device 300 are increased. In contrast, in a case where the original skill data 810 collected by the collection unit 200 is decimated coarsely, it is difficult to obtain a correct command value. In this respect, the inventors of the present invention found out that a processing load and costs of the behavior estimation device 300 can be reduced and a correct command value can be obtained by using the decimated skill data that is obtained by sampling the skill data at a frequency that is approximately from 5 to 100 times as high as the operation frequency of the control target object, or more preferably at a frequency that is from 20 to 50 times as high as the operation frequency of the control target object.

Next, another example of the pre-processing for the skill data will be described. The skill data pre-processing unit 470 can generate a plurality of pieces of decimated skill data by sampling the skill data collected by the collection unit 200 at a plurality of different timings depending on a frequency according to the operation frequency of the control target object.

Figure 32:
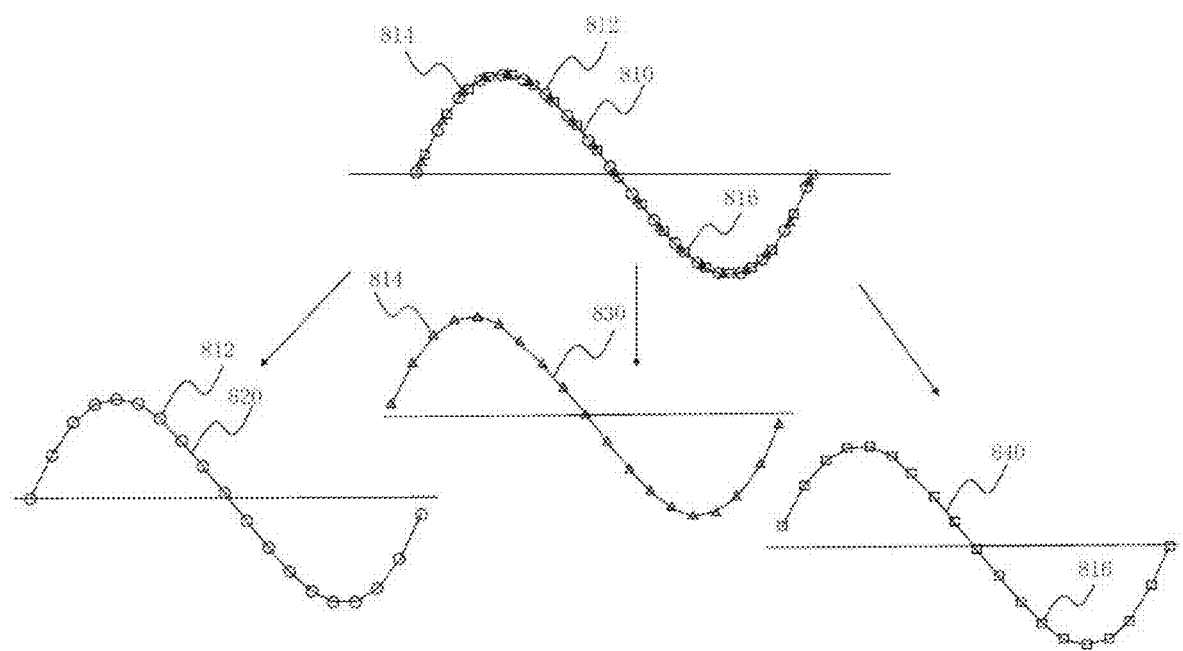
FIG. 32 is a diagram for describing a concept of sampling processing performed by the skill data pre-processing unit at different timings.

This will be described with reference to FIG. 32. FIG. 32 is a diagram for describing a concept of sampling processing performed by the skill data pre-processing unit at different timings. The skill data pre-processing unit 470 generates decimated skill data 820 of the original skill data 810 by collecting skill data at a plurality of sampling points 812 that are marked with circles. The skill data pre-processing unit 470 generates decimated skill data 830 of the original skill data 810 by collecting skill data at sampling points 814 that are marked with a plurality of triangles at timings different from the sampling points 812. Further, the skill data pre-processing unit 470 generates decimated skill data 840 of the original skill data 810 by collecting skill data at sampling points 816 that are marked with a plurality of squares at timings different from the sampling points 812 and the sampling points 814. That is, the skill data pre-processing unit 470 can reuse the decimated skill data by generating three types of decimated skill data 820, 830, and 840, based on a single piece of original skill data 810.

In this manner, when the skill data pre-processing unit 470 generates a plurality of pieces of decimated skill data, the behavior estimation device 300 estimates a command value for causing the control target object to automatically behave, based on the plurality of pieces of decimated skill data 820, 830, and 840 and the response output from the control target object.

To test effectiveness of the present embodiment, a comparative experiment using three models was performed by using the bilateral system of FIG. 21 and FIG. 22. The first model uses a method in which a large number of pieces of skill data are acquired, and the skill data is not reused. Specifically, skill data of line erasing using the eraser E was acquired five times for each of three heights (for example, 20 mm, 50 mm, and 80 mm) of the paper sheet P, and 15 pieces of decimated skill data were generated by performing the decimating processing of FIG. 31 on each of the total of 15 pieces of skill data.

The second model uses a method in which a small number of pieces of skill data are acquired, and the number of pieces of skill data is increased. Specifically, skill data of line erasing using the eraser E was acquired once for each of three heights (for example, 20 mm, 50 mm, and 80 mm) of the paper sheet P, and 60 pieces of decimated skill data were generated by performing the decimating reuse processing (20 variations of reuse processing) of FIG. 32 on each of the total of 3 pieces of skill data.

The third model uses a method in which a small number of pieces of skill data are acquired, and the skill data is not reused. Specifically, skill data of line erasing using the eraser E was acquired once for each of three heights (for example, 20 mm, 50 mm, and 80 mm) of the paper sheet P, and 3 pieces of decimated skill data were generated by performing the decimating processing of FIG. 31 on each of the total of 3 pieces of skill data.

When the slave robot 720 was caused to automatically behave by using the decimated skill data generated in each of the three models, the line erasing was satisfactorily equally performed in the cases of the first model and the second model. On the other hand, the line erasing was not able to be satisfactorily performed in the case of the third model. The results described above show that acquisition of a certain number of pieces of skill data is required when the decimated skill data is not reused. In contrast, when the decimated skill data is reused as in the present embodiment, even if only a small number of pieces of skill data are acquired, the automatic behavior of the control target object can be implemented in a similar manner to the case where a large number of pieces of skill data are acquired. Thus, according to the present embodiment, labor of acquiring the skill data can be reduced, and satisfactory automatic behavior of the control target object can be implemented.

Next, another example of the pre-processing for the skill data will be described. The skill data pre-processing unit 470 can generate a plurality of pieces of decimated skill data by sampling a plurality of types of information included in the skill data collected by the collection unit 200 at different frequencies according to the operation frequency of the control target object.

Figure 33:
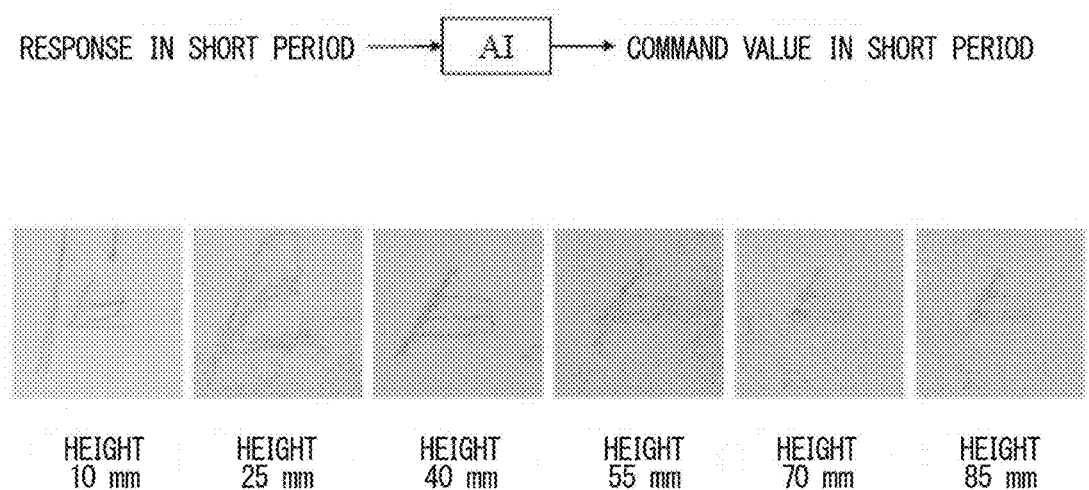
FIG. 33 is a diagram illustrating results of a task of writing the letter "A" on a piece of paper.
Figure 34:
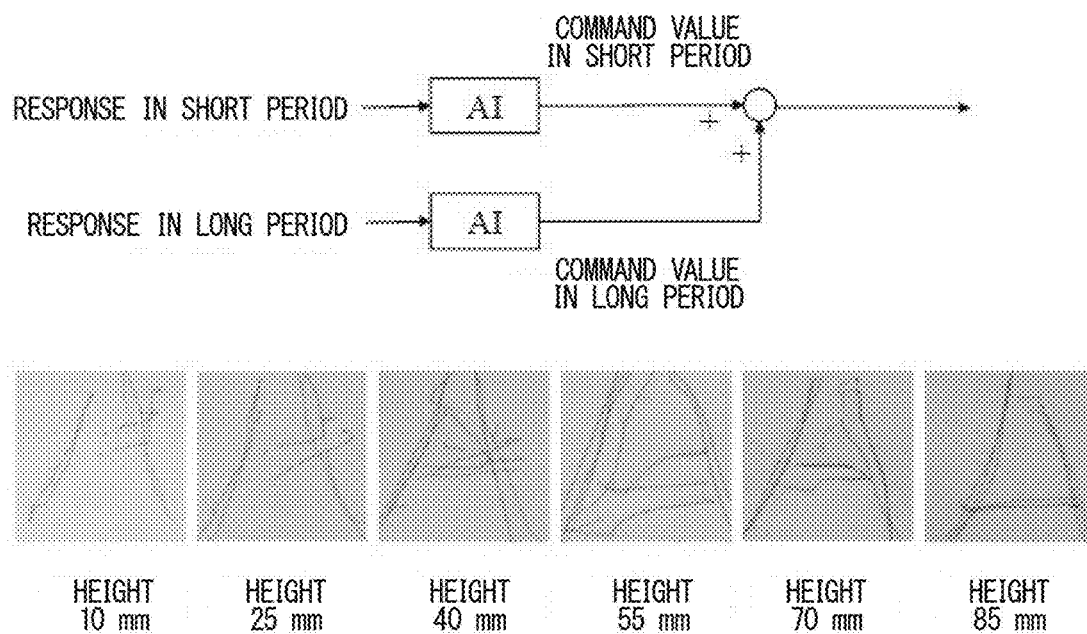
FIG. 34 is a diagram illustrating results of a task of writing the letter "A" on a piece of paper.
Figure 35:
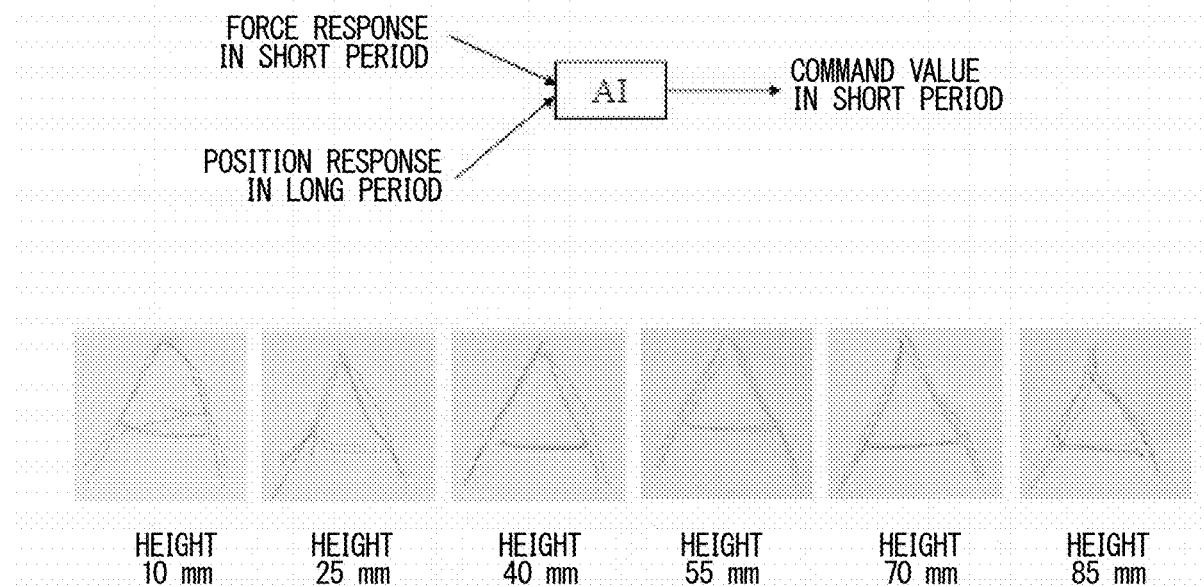
FIG. 35 is a diagram illustrating results of a task of writing the letter "A" on a piece of paper.

This will be described with reference to an experiment of a task of a writing letter "A" on a piece of paper by using the bilateral system of FIG. 21 and FIG. 22. FIGS. 33 to 35 are each a diagram illustrating results of the task of writing the letter "A" on a piece of paper. In the present experiment, the skill data was provided in three patterns in which the height from the desk to the paper sheet was 10 mm, 40 mm, and 70 mm, and whether the letter "A" was able to be written even under a state in which the height of the paper sheet was unknown was compared between different decimating (sampling) periods of the skill data. The first model is a model in which the sampling processing is performed on all the pieces of information (position information and force information) included in the skill data in a short period. In this case, as illustrated in FIG. 33, the slave robot 720 was not able to write the letter "A" at all.

In contrast, the second model is a model in which sampling processing is performed on each of the position information and the force information included in the skill data in a short period and a long period, and AI is caused to learn the position information and the force information resulting from the sampling processing separately. In this case, as illustrated in FIG. 34, the slave robot 720 was able to correctly grasp the outline of the letter "A", but the response was vibratory.

In contrast, the third model is a model in which a plurality of pieces of decimated skill data is generated by performing the sampling processing on the position information included in the skill data with a long period and performing the sampling processing on the force information with a short period. In this case, as illustrated in FIG. 35, the slave robot 720 was able to correctly write the letter "A" even at an unknown height of the paper sheet.

Note that, as for the task of writing the letter "A" as in the present experiment, satisfactory results were obtained in a case that the sampling processing is performed on the position information in a long period and on the force information in a short period. However, regarding the sampling processing of the skill data, it is not necessarily true that a long period is satisfactory for the position information and a short period is satisfactory for the force information, and the period depends on each individual task. What is important is that a sampling period may be changed depending on each piece of information (position information and force information) and also that a plurality of periods may be applied to each piece of information as illustrated in FIG. 34. The present experiment illustrates a case in which the position information and the force information are used. However, it is also effective to change the decimating period as described above for the image information, the acoustic information, and the haptic information as well.

The skill data pre-processing unit 470 can generate a plurality of pieces of decimated skill data by sampling a plurality of types of information included in the skill data collected by the collection unit 200 at different frequencies according to the operation frequency of the control target object such that correlation between the plurality of pieces of decimated skill data described above is reduced.

Figure 36:
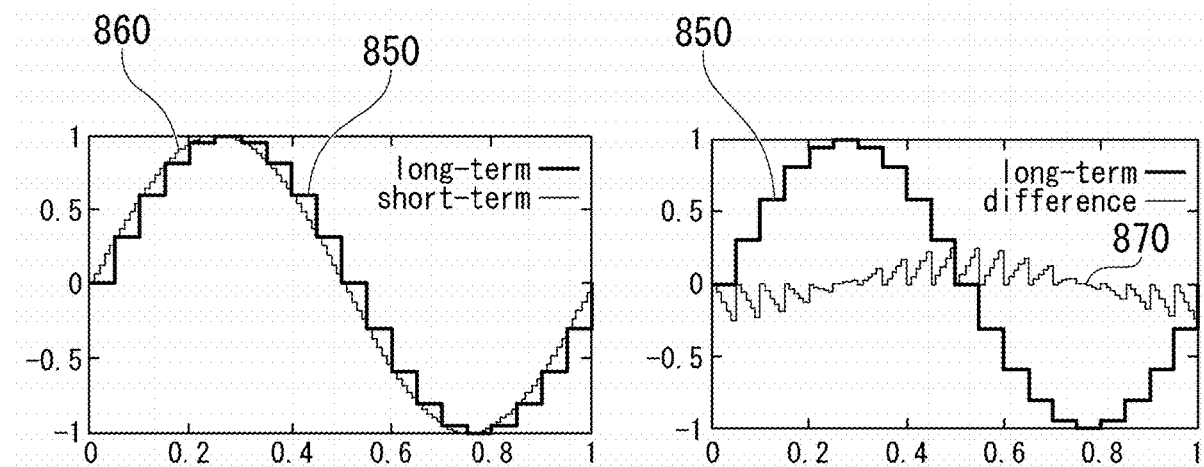
FIG. 36 is a diagram for describing correlation between pieces of decimated skill data.

This point will be described with reference to FIG. 36. FIG. 36 is a diagram for describing correlation between pieces of decimated skill data. In the field of machine learning, it is known that it is satisfactory to have less correlation between inputs. Specifically, when the sampling processing of the skill data includes only sampling in a short period and sampling in a long period, as illustrated on the left side of FIG. 36, decimated skill data 850 sampled in the long period and decimated skill data 860 sampled in the short period have great correlation, although slight differences are observed. In contrast, for example, when the sampling processing of the skill data includes sampling in a "long period" and sampling in a "difference between long and short periods", as illustrated on the right side of FIG. 36, the decimated skill data 850 sampled in the long period and decimated skill data 870 sampled in the difference between long and short periods have less correlation. As described above, by performing the sampling processing such that the correlation between the plurality of pieces of decimated skill data is reduced, satisfactory automatic behavior of the control target object can be implemented.

REFERENCE SIGNS LIST

100 Behavior estimation apparatus
200 Collection unit
300 Behavior estimation device
410 Position controller
420 Force controller
450 Pre-processing unit
470 Skill data pre-processing unit
500, 600 Bilateral system
510, 610 Master robot
520, 620 Slave robot
820, 830, 840, 850, 860, 870 Decimated skill data

The invention claimed is:

1. A behavior estimation apparatus comprising:
a memory; and
a processor connected to the memory, the memory storing instructions to:
collect skill data obtained when a slave apparatus is remotely controlled via a master apparatus by using a bilateral system capable of operating the slave apparatus via the master apparatus through bidirectional remote control between the master apparatus and the slave apparatus; and
estimate command values for causing the slave apparatus to automatically behave, based on a plurality of the skill data collected and output response of the slave apparatus, wherein
the processor collects as the skill data output response of the master apparatus obtained when the slave apparatus is operated via the master apparatus in consideration of a control delay of action of the slave apparatus in response to operation of the master apparatus when the slave apparatus is operated by using the bilateral system,
the processor causes the slave apparatus to automatically behave, based on the command values estimated.

2. The behavior estimation apparatus according to claim 1, wherein
the memory further stores instructions to to estimate a position command value and a force command value as the command value for causing the slave apparatus to automatically behave,
output position control input to be input, to the slave apparatus, based on the position command value estimated and a position response output from the slave apparatus, and
output force control input to be input to the slave apparatus, based on the force command value estimated and a force response output from the slave apparatus.

3. The behavior estimation apparatus according to claim 1, wherein
the master apparatus is a master robot configured to act according to operation of an operator,
the slave apparatus is a slave robot configured to act according to action of the master robot, and
the bilateral system allows the operator to recognize reaction information from the slave robot and perform adaptive operation through the bidirectional control between the master robot and the slave robot.

4. The behavior estimation apparatus according to claim 1, wherein
the processor is capable of capturing a surrounding environment of the slave apparatus, is capable of acquiring surrounding acoustic information of the slave apparatus, or is capable of acquiring haptic information of the slave apparatus.

5. The behavior estimation apparatus according to claim 1, wherein the memory further stores instructions to perform pre-processing on at least any one of a position response and a force response output from the slave apparatus, a position command value and a force command value output, or position control input and force control input to be input to the slave apparatus.

6. The behavior estimation apparatus according to claim 5, wherein
the memory further stores instructions to: on at least any one of the force response output from the slave apparatus, the force command value output, or the force control input to be input to the slave apparatus, the pre-processing such that a first variation of value after the pre-processing becomes larger than a second variation of value after the pre-processing, the first variation of value corresponding to variation, in a first range, of the force response, the force command value, or the force control input, the second variation of value corresponding to variation, in a second range larger than the first range, of the force response, the force command value, or the force control input.

7. The behavior estimation apparatus according to claim 5, the memory further stores instructions
to classify at least any one of the force response output from the slave apparatus, the force command value output, or the force control input to be input to the slave apparatus into a plurality of the force responses, a plurality of the force command values, and a plurality of the force control inputs according to a magnitude of the force response, the force command value, or the force control input, respectively, wherein
the plurality of the force responses, the plurality of the force command values, or the plurality of the force control inputs classified are handled as different force responses, different force command values, or different force control inputs, respectively.

8. The behavior estimation apparatus according to claim 1, the memory further stores instructions
to generate a piece of decimated skill data by sampling the skill data collected at a frequency according to an operation frequency of the slave apparatus, and
estimate the command value for causing the slave apparatus to automatically behave, based on the piece of decimated skill data and the response output from the slave apparatus.

9. The behavior estimation apparatus according to claim 8, wherein
the memory further stores instructions to generate a plurality of the pieces of decimated skill data by sampling the skill data collected at a plurality of different timings at the frequency according to the operation frequency of the slave apparatus, and
estimate the command value for causing the slave apparatus to automatically behave, based on the plurality of the pieces of decimated skill data and the response output from the slave apparatus.

10. The behavior estimation apparatus according to claim 8, wherein
the memory further stores instructions to generate a plurality of the pieces of decimated skill data by sampling a plurality of types of information included in the skill data collected at a different frequency according to the operation frequency of the slave apparatus, and estimate the command value for causing the slave apparatus to automatically behave, based on the plurality of the pieces of decimated skill data and the response output from the slave apparatus.

11. The behavior estimation apparatus according to claim 10, wherein the memory further stores instructions to generate the plurality of the pieces of decimated skill data by sampling the plurality of types of information included in the skill data collected at the different frequency according to the operation frequency of the slave apparatus such that correlation between the plurality of the pieces of decimated skill data is reduced.

12. The behavior estimation apparatus according to claim 8, wherein the frequency according to the operation frequency of the slave apparatus is a frequency approximately from 5 to 100 times as high as the operation frequency.

13. The behavior estimation apparatus according to claim 12, wherein the frequency according to the operation frequency of the slave apparatus is a frequency from 20 to 50 times as high as the operation frequency.

14. A behavior estimation method comprising:

collecting skill data obtained when a slave apparatus is remotely controlled via the master apparatus by using a bilateral system capable of operating the slave apparatus via the master apparatus through bidirectional remote control between the master apparatus and the slave apparatus; and estimating command values for causing the slave apparatus to automatically behave, based on a plurality of the skill data collected by the collecting and output response of the slave apparatus, wherein in the collecting, as the skill data, output response of the master apparatus, is collected, the skill data being obtained when the slave apparatus is operated via the master apparatus in consideration of a control delay of action of the slave apparatus in response to operation of the master apparatus when the slave apparatus is operated by using the bilateral system, in the collecting the plurality of the skill data under a plurality of different conditions are collected, and the slave apparatus is caused to automatically behave, based on the command values estimated by the estimating.

15. A non-transitory computer readable storage medium storing a program that causes a computer to perform:

collecting skill data obtained when a slave apparatus is remotely controlled via the master apparatus by using a bilateral system capable of operating the slave apparatus via the master apparatus through bidirectional remote control between the master apparatus and the slave apparatus; and estimating command values for causing the slave apparatus to automatically behave, based on a plurality of the skill data collected by the collecting and output response of the slave apparatus, wherein in the collecting, as the skill data, output response of the master apparatus. is collected, the skill data being obtained when the slave apparatus is operated via the master apparatus in consideration of a control delay of action of the slave apparatus in response to operation of the master apparatus when the slave apparatus is operated by using the bilateral system, in the collecting the plurality of the skill data under a plurality of different conditions are collected, and the slave apparatus is caused to automatically behave, based on the command values estimated by the estimating.

\* \* \* \* \*

UNITED STATES PATENT AND TRADEMARK OFFICE
CERTIFICATE OF CORRECTION

| | | |
|---|---|---|
| PATENT NO. | : 11,787,037 B2 | Page 1 of 1 |
| APPLICATION NO. | : 15/733744 | |
| DATED | : October 17, 2023 | |
| INVENTOR(S) | : Sho Sakaino | |

It is certified that error appears in the above-identified patent and that said Letters Patent is hereby corrected as shown below:

In the Claims

In Column 29, Line 43, in Claim 2, delete "to to" and insert --to-- therefor

In Column 29, Line 47, in Claim 2, delete "input," and insert --input-- therefor In Column 32, Line 8, in Claim 14, delete "collecting" and insert --collecting,-- therefor In Column 32, Line 26, in Claim 15, delete "apparatus." and insert --apparatus,-- therefor In Column 32, Line 32, in Claim 15, delete "collecting" and insert --collecting,-- therefor Signed and Sealed this
Fourteenth Day of January, 2025

Derrick Brent
*Acting Director of the United States Patent and Trademark Office*